(12) United States Patent
Inoue et al.

(10) Patent No.: US 11,807,228 B2
(45) Date of Patent: Nov. 7, 2023

(54) DRIVING SUPPORT SYSTEM THAT EXECUTES A RISK AVOIDANCE CONTROL FOR REDUCING A RISK OF COLLISION WITH AN OBJECT IN FRONT OF A VEHICLE

(71) Applicant: Toyota Jidosha Kabushiki Kaisha, Toyota (JP)

(72) Inventors: Shintaro Inoue, Naka-gun Kanagawa-ken (JP); Kazuyuki Fujita, Gotemba (JP); Minami Sato, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 17/128,881

(22) Filed: Dec. 21, 2020

(65) Prior Publication Data

US 2021/0291820 A1 Sep. 23, 2021

(30) Foreign Application Priority Data

Mar. 23, 2020 (JP) ................................. 2020-051680

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 10/18* (2013.01);
(Continued)

(58) Field of Classification Search
CPC .. B60W 30/09; B60W 30/0956; B60W 10/18; B60W 10/20; B60W 2552/53;
(Continued)

(56) References Cited

U.S. PATENT DOCUMENTS

2008/0097699 A1* 4/2008 Ono ................... B62D 15/0265
701/300
2017/0327110 A1 11/2017 Inoue et al.
(Continued)

FOREIGN PATENT DOCUMENTS

JP 2007099237 A * 4/2007
JP 2009051430 A * 3/2009
(Continued)

OTHER PUBLICATIONS

Wahid et al., "Study on Potential Field Based Motion Planning and Control for Automated Vehicle Collision Avoidance Systems," in 2017 IEEE International Conference on Mechatronics: 208-213 (https://ieeexplore.ieee.org/abstract/document/7921105). (Year: 2017).*
(Continued)

*Primary Examiner* — Donald J Wallace
*Assistant Examiner* — Daniel M. Robert
(74) *Attorney, Agent, or Firm* — Dinsmore & Shohl LLP

(57) ABSTRACT

A driving support system executes a risk avoidance control for reducing a risk of collision with an object in front of a vehicle. A risk potential field represents a risk value as a function of position. An obstacle potential field is a risk potential field in which the risk value is maximum at a position of the object and decreases as a distance from the object increases. A vehicle center potential field is the risk potential field in which a valley of the risk value extends in a lane longitudinal direction from a position of the vehicle. A first risk potential field is the sum of the vehicle center potential field and the obstacle potential field. The driving support system executes a steering control such that the vehicle follows the first valley of the risk value represented by the first risk potential field.

7 Claims, 28 Drawing Sheets

(51) Int. Cl.
  B60W 10/18 (2012.01)
  B60W 10/20 (2006.01)
(52) U.S. Cl.
  CPC ......... *B60W 10/20* (2013.01); *B60W 2552/53* (2020.02); *B60W 2554/4029* (2020.02)
(58) Field of Classification Search
  CPC ..... B60W 2554/4029; B60W 2754/30; B60W 10/04; B60W 2554/803
  See application file for complete search history.

(56) References Cited

U.S. PATENT DOCUMENTS

| | | | |
|---|---|---|---|
| 2018/0348770 A1 | 12/2018 | Yasui | |
| 2019/0202450 A1* | 7/2019 | Maeda | B60W 10/184 |
| 2020/0164873 A1* | 5/2020 | Nanri | G06V 20/588 |
| 2021/0061350 A1* | 3/2021 | Kinoshita | B62D 15/025 |
| 2021/0291820 A1* | 9/2021 | Inoue | B60W 30/09 |

FOREIGN PATENT DOCUMENTS

| | | | |
|---|---|---|---|
| JP | 2017182563 A | * | 10/2017 |
| JP | 2017-206040 A | | 11/2017 |
| JP | 2018-203034 A | | 12/2018 |
| JP | 2019028524 A | * | 2/2019 |
| JP | 2019086892 A | | 6/2019 |

OTHER PUBLICATIONS

Noto et al., "Steering Assisting System for Obstacle Avoidance Based on Personalized Potential Field," 2012 15th International IEEE Conference on Intelligent Transportation Systems (https://ieeexplore.ieee.org/document/6338628): 1702-1707. (Year: 2012).*
U.S. Appl. No. 17/173,489, filed Feb. 11, 2021.

* cited by examiner

DRIVING SUPPORT SYSTEM THAT EXECUTES A RISK AVOIDANCE CONTROL FOR REDUCING A RISK OF COLLISION WITH AN OBJECT IN FRONT OF A VEHICLE

CROSS-REFERENCE TO RELATED APPLICATION

This application claims priority to Japanese Patent Application No. 2020-051680 filed on Mar. 23, 2020, incorporated herein by reference in its entirety.

BACKGROUND

1. Technical Field

The present disclosure relates to a driving support control that supports driving of a vehicle. In particular, the present disclosure relates to a risk avoidance control for reducing the risk of collision with an object in front of the vehicle.

2. Description of Related Art

Japanese Unexamined Patent Application Publication No. 2018-203034 (JP 2018-203034 A) discloses a traveling path determination device for determining a traveling path of a vehicle. The traveling path determination device determines the traveling path of the vehicle using a risk potential region and a benefit potential region. The risk potential region represents a region in which there may be obstacles such as pedestrians and other vehicles. The benefit potential region represents an ideal travel region in which the vehicle should travel. This benefit potential region is set based on the driving data of skilled drivers.

Japanese Unexamined Patent Application Publication No. 2017-206040 (JP 2017-206040 A) discloses a driving support control device that supports the driving of a vehicle. Pedestrians moving by the road may cross the road afterwards. That is, pedestrians moving by the road have a potential risk. Thus, when detecting a pedestrian moving by the road, the driving support control device automatically steers the vehicle in a direction away from the pedestrian as necessary.

SUMMARY

A "risk avoidance control" for reducing the risk of collision with an object in front of the vehicle will be discussed. In particular, a risk avoidance control based on a risk potential field will be discussed. The risk potential field expresses a risk value related to traveling of a vehicle as a function of position. The risk avoidance control is realized by executing a vehicle travel control such that the vehicle follows a "valley" of the risk value. At this time, depending on the setting of the risk potential field, the risk avoidance control may be executed unnecessarily or excessively.

For example, a case will be discussed where the risk potential field includes a lane center potential field for restraining the vehicle from departing from the lane. The valley of the risk value represented by the lane center potential field extends in the longitudinal direction of the lane along the lane center. That is, the position of the valley of the lane center potential field is fixed at the lane center. Accordingly, the lane center potential field constantly generates a force that draws the vehicle to the lane center. In the steering control, which is one of the risk avoidance controls, the lane center potential field also affects the vehicle behavior. However, the force that draws the vehicle to the lane center is for suppressing lane departure, and is originally unrelated to object avoidance. Therefore, the lane center potential field may cause a vehicle behavior unrelated to the object avoidance. The occurrence of a vehicle behavior unrelated to the object avoidance means that a steering control as the risk avoidance control is executed unnecessarily or excessively.

Besides the lane center potential field, similar phenomenon occurs with a potential field incorporating a traveling path of a skilled driver as shown in JP 2018-203034 A. As long as the position of the valley of the potential field is fixed to the road, problems similar to those with the lane center potential field may occur.

Thus, there is room for improvement in the risk avoidance control based on the risk potential field.

One object of the present disclosure is to provide a technique capable of suppressing unnecessary or an excessive risk avoidance control based on a risk potential field.

A first aspect relates to a driving support system that supports driving of a vehicle. The driving support system includes a storage device and a processor. The storage device stores driving environment information indicating a driving environment of the vehicle. The processor executes a risk avoidance control for reducing a risk of collision with an object in front of the vehicle, based on the driving environment information. A risk potential field represents a risk value as a function of position. An obstacle potential field is a risk potential field in which the risk value is maximum at a position of the object and decreases as a distance from the object increases. A lane longitudinal direction is a direction along which a lane in which the vehicle is present extends. A vehicle center potential field is the risk potential field in which a valley of the risk value extends in a lane longitudinal direction from a position of the vehicle. Therefore, a position of the valley of the vehicle center potential field changes with the position of the vehicle. The risk avoidance control includes a steering control for steering the vehicle. The processor sets the vehicle center potential field and the obstacle potential field based on the driving environment information. The processor further sets the sum of the vehicle center potential field and the obstacle potential field as the first risk potential field. Then, the processor executes the steering control such that the vehicle follows a first valley, the first valley being a valley of the risk value represented by the first risk potential field.

A second aspect has the following features in addition to the first aspect. A lane width direction is a direction orthogonal to the lane longitudinal direction. The processor sets a forward gaze point at a position in front of the vehicle by a first distance along a traveling direction of the vehicle. The processor calculates a first deviation based on the first risk potential field, the first deviation being a deviation in the lane width direction between the forward gaze point and the first valley. Then, the processor executes a steering control such that the first deviation decreases.

A third aspect has the following features in addition to the second aspect. A first search range is a range extending in the lane width direction from the forward gaze point. The processor searches for the first valley within the first search range.

A fourth aspect further has the following features in addition to any of the first to third aspects. The risk avoidance control further includes a deceleration control for decelerating the vehicle. The processor sets a second risk potential field including the obstacle potential field. A second valley is a valley of the risk value represented by the second risk potential field. A correction gap is a lateral distance between the object and the second valley. When the correction gap is smaller than a predetermined gap and a suppression amount is larger than a threshold value, the processor executes the deceleration control, the suppression amount being a difference between the predetermined gap and the correction gap.

A fifth aspect further has the following features in addition to the fourth aspect. The processor sets the second risk potential field by superimposing only the obstacle potential fields set for the respective objects without using the vehicle center potential field.

A sixth aspect further has the following features in addition to the fourth or fifth aspect. The processor sets a target deceleration such that the target deceleration increases as the suppression amount increases, and executes the deceleration control in accordance with the target deceleration.

A seventh aspect further has the following features in addition to any of the fourth to sixth aspects. A second search range is a range between the position of the object and a position away from the object by the predetermined gap. The processor searches the second valley within the second search range. The processor calculates the suppression amount when the second valley is present in the second search range. The processor does not calculate the suppression amount and does not execute the deceleration control when the second valley is not present in the second search range.

An eighth aspect relates to a driving support system that supports driving of a vehicle. The driving support system includes a storage device and a processor. The storage device stores driving environment information indicating a driving environment of the vehicle. The processor executes a risk avoidance control for reducing a risk of collision with an object in front of the vehicle, based on the driving environment information. A risk potential field represents a risk value as a function of position. An obstacle potential field is a risk potential field in which the risk value is maximum at a position of the object and decreases as a distance from the object increases. The risk avoidance control includes a deceleration control for decelerating the vehicle. The processor sets the obstacle potential field based on the driving environment information. The processor further sets a second risk potential field by superimposing only the obstacle potential fields set for the respective objects. A second valley is a valley of the risk value represented by the second risk potential field. A correction gap is a lateral distance between the object and the second valley. When the correction gap is smaller than a predetermined gap and a suppression amount is larger than a threshold value, the processor executes the deceleration control, the suppression amount being a difference between the predetermined gap and the correction gap.

According to the first aspect, the first risk potential field is applied to the steering control of the risk avoidance control. Specifically, the steering control is executed so as to follow the first valley of the first risk potential field. The first risk potential field includes the vehicle center potential field. The valley of the vehicle center potential field extends in the lane longitudinal direction from the position of the vehicle. Thus, the position of the valley of the vehicle center potential field is not fixed and dynamically changes with the position of the vehicle. Unlike the case of the lane center potential field, the vehicle center potential field does not generate a force that draws the vehicle to the lane center regardless of object avoidance. Since the valley of the vehicle center potential field is incorporated in the first valley, an unnecessary steering control or an excessive steering control is suppressed. As a result, the discomfort felt by the occupant of the vehicle is suppressed.

According to the eighth aspect, the second risk potential field is applied to the deceleration control of the risk avoidance control. Specifically, the second risk potential field is used for calculating the suppression amount, and the suppression amount is used as a criterion for determining whether to execute the deceleration control. Since the second risk potential field includes only the obstacle potential field, the position of the second valley is determined based on only the positional relationship of the object. The suppression amount is calculated based on such a second valley, so an appropriate suppression amount incorporating the proximity situation of the object can be obtained. As a result, an unnecessary deceleration control or an excessive deceleration control is suppressed. As a result, the discomfort felt by the occupant of the vehicle is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Driving Support System 1-1. Overview

Figure 1:
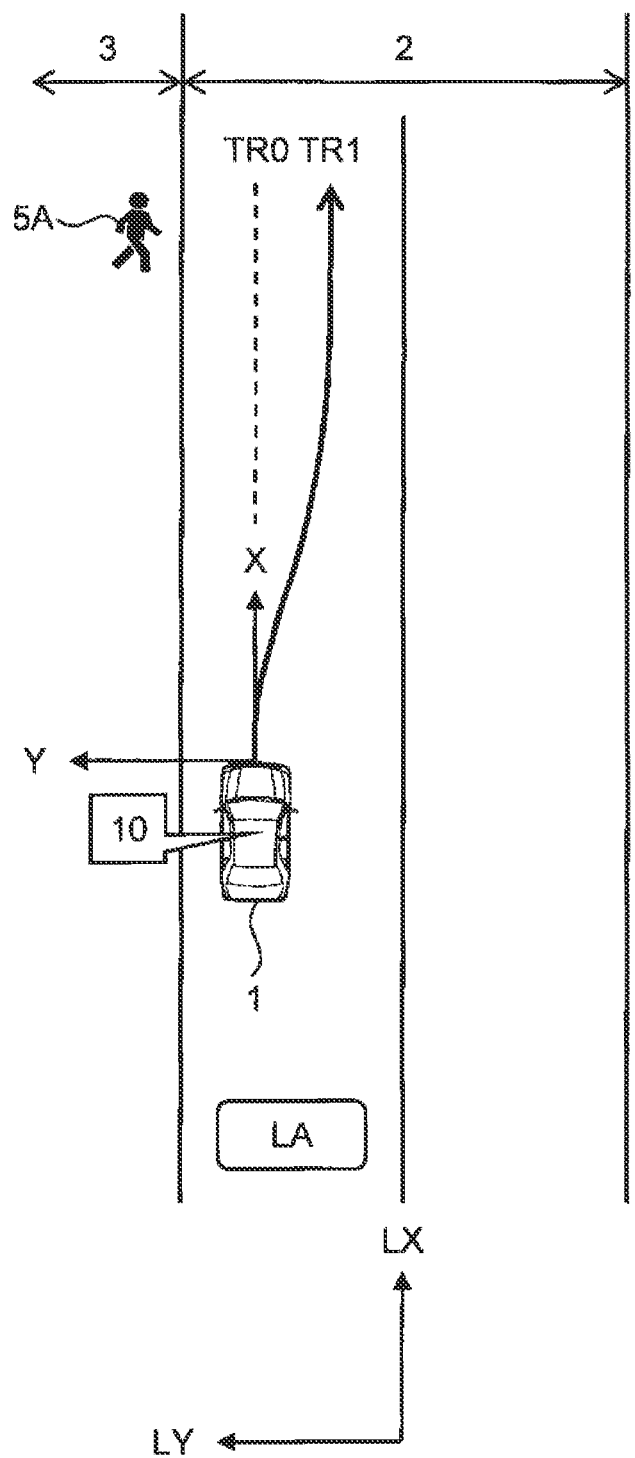
FIG. 1 is a conceptual diagram illustrating an overview of a driving support system according to an embodiment of the present disclosure.

FIG. 1 is a conceptual diagram illustrating an overview of a driving support system 10 according to the present embodiment. The driving support system 10 executes a "driving support control" that supports driving of a vehicle 1. The driving support control may be included in an autonomous driving control. Typically, the driving support system 10 is mounted on the vehicle 1. Alternatively, at least a part of the driving support system 10 may be disposed in an external device outside the vehicle 1 to execute a driving support control remotely. That is, the driving support system 10 may be dispersedly disposed in the vehicle 1 and the external device.

The driving support control includes a "risk avoidance control" that avoids a risk in front of the vehicle 1 in advance. More specifically, the driving support system 10 recognizes an object 5 in front of the vehicle 1. Then, the driving support system 10 executes a risk avoidance control in order to reduce (avoid) the risk of collision with the object 5 in advance. Such risk avoidance control includes at least one of a steering control for steering the vehicle 1 and a deceleration control for decelerating the vehicle 1.

For example, in FIG. 1, the vehicle 1 is traveling in a lane LA in a roadway 2. There is a pedestrian 5A in a roadside region 3 (road shoulder, roadside band, sidewalk, etc.) adjacent to the roadway 2. The pedestrian 5A may enter the Lane LA. Thus, the pedestrian 5A in the roadside region 3 is a risk for the vehicle 1. The driving support system 10 executes a risk avoidance control as necessary in order to reduce the risk of collision with the pedestrian 5A. For example, the driving support system 10 automatically steers the vehicle 1 in a direction away from the pedestrian 5A. In FIG. 1, a trajectory TR0 represents a trajectory of the vehicle 1 when the risk avoidance control is not executed. On the other hand, a trajectory TR1 represents a trajectory of the vehicle 1 when the risk avoidance control is executed.

The pedestrian 5A may be replaced by a bicycle or a two-wheeled vehicle. Further, pedestrians, bicycles, two-wheeled vehicles, preceding vehicles, etc. in the roadway 2, besides the roadside region 3, are subjects of the risk avoidance control.

Figure 2:
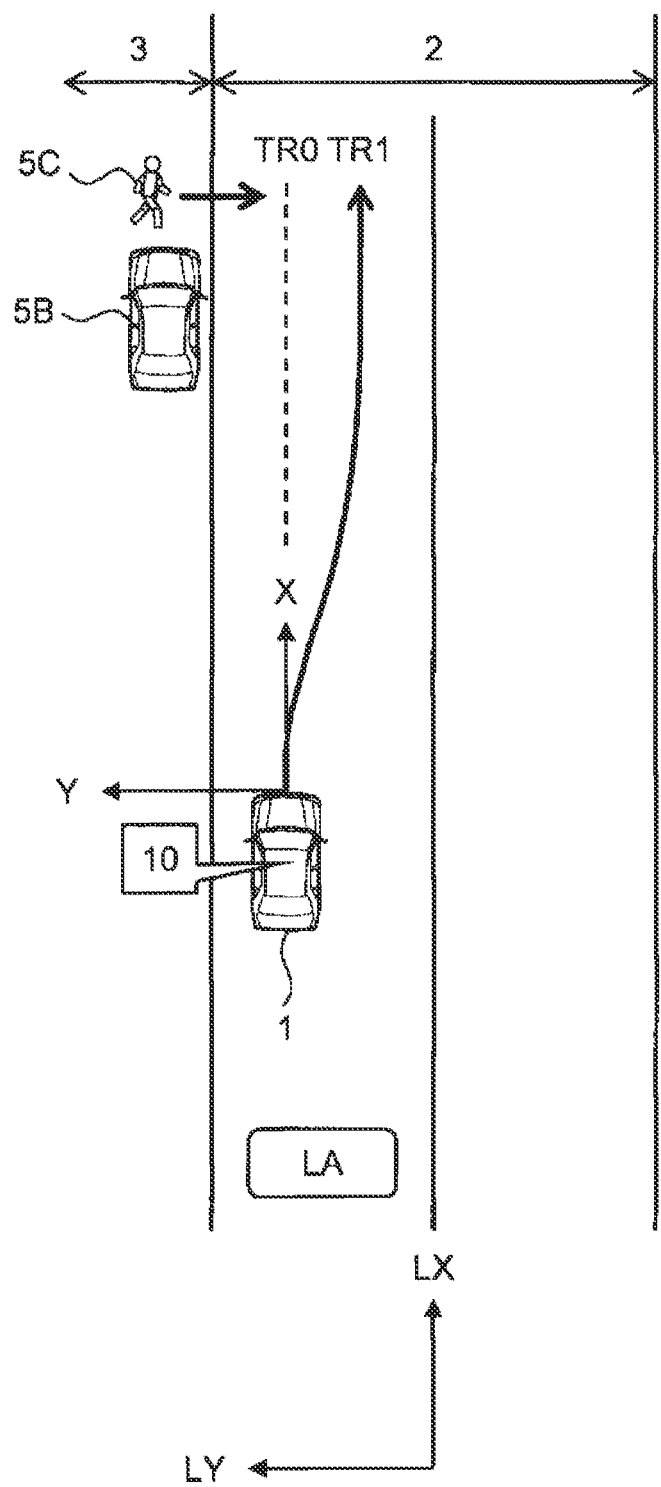
FIG. 2 is a conceptual diagram illustrating an example of a risk avoidance control according to the embodiment of the present disclosure.

FIG. 2 is a conceptual diagram illustrating another example of the risk avoidance control. The subject of the risk avoidance control is not limited to an "explicit risk" such as the above-mentioned pedestrian 5A, but may also include a "potential risk". For example, in FIG. 2, there is a parked vehicle 5B in the roadside region 3 in front of the vehicle 1. The region beyond the parked vehicle 5B is a blind spot, from which the pedestrian 5C may pop out. Thus, the parked vehicle 5B in front of the vehicle 1 is a risk for the vehicle 1 and is a subject of the risk avoidance control. For example, the driving support system 10 automatically steers the vehicle 1 in a direction away from the parked vehicle 5B.

As described above, the object 5 that is the subject of the risk avoidance control includes at least one of pedestrians, bicycles, two-wheeled vehicles, and other vehicles in front of the vehicle 1.

Here, a coordinate system and directions will be defined. The vehicle coordinate system (X, Y) is a relative coordinate system fixed to the vehicle 1, and changes with the movement of the vehicle 1. The X direction is a forward direction (traveling direction) of the vehicle 1. The Y direction is a lateral direction of the vehicle 1. The X direction and the Y direction are orthogonal to each other. The LX direction (lane longitudinal direction) is a direction in which the lane LA extends. The LY direction (lane width direction) is a width direction of the lane LA. The LX direction and the LY direction are orthogonal to each other. The longitudinal distance is a distance in the X direction or the LX direction. The lateral distance is a distance in the Y direction or the LY direction.

1-2. Configuration Example

Figure 3:
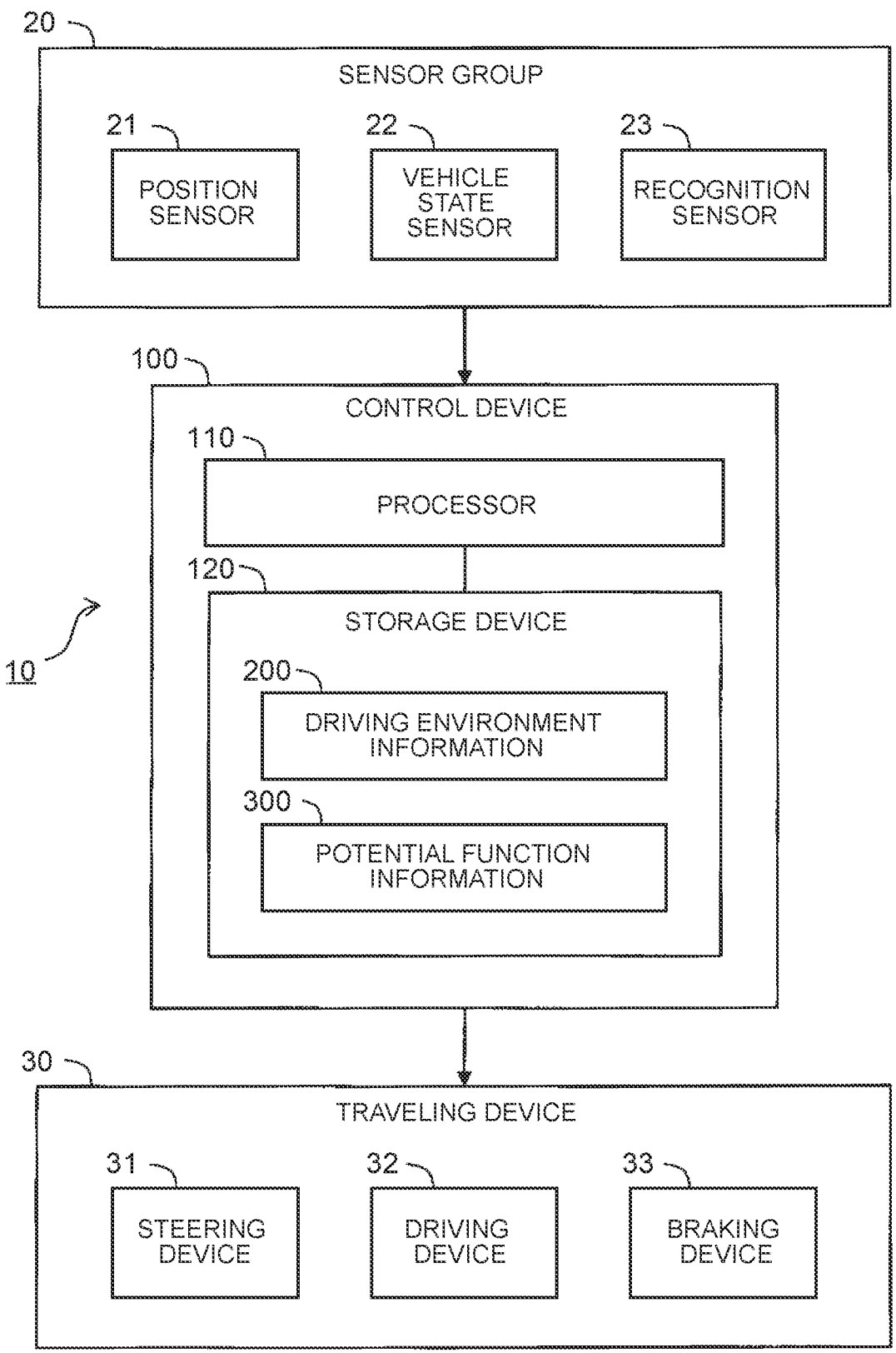
FIG. 3 is a block diagram showing a configuration example of a vehicle and the driving support system according to the embodiment of the present disclosure.

FIG. 3 is a block diagram schematically showing a configuration example of the vehicle 1 and the driving support system 10 according to the present embodiment. In particular, FIG. 3 shows a configuration example related to the risk avoidance control. The vehicle 1 includes a sensor group 20 and a traveling device 30.

The sensor group 20 includes a position sensor 21, a vehicle state sensor 22, and a recognition sensor 23. The position sensor 21 detects the position and the orientation of the vehicle 1 in the absolute coordinate system. Examples of the position sensor 21 include a Global Positioning System (GPS) sensor. The vehicle state sensor 22 detects the state of the vehicle 1. Examples of the vehicle state sensor 22 include a vehicle speed sensor, a yaw rate sensor, a lateral acceleration sensor, a steering angle sensor, and the like. The recognition sensor 23 recognizes (detects) the situation around the vehicle 1. Examples of the recognition sensor 23 include a camera, a radar, a laser imaging detection and ranging (LIDAR), and the like.

The traveling device 30 includes a steering device 31, a driving device 32, and a braking device 33. The steering device 31 steers the wheels of the vehicle 1. For example, the steering device 31 includes a power steering (electric power steering (EPS)) device. The driving device 32 is a driving power source that generates a driving force. Examples of the driving device 32 include an engine, an electric motor, an in-wheel motor, and the like. The braking device 33 generates a braking force.

The driving support system 10 includes at least a control device 100. The driving support system 10 may include the sensor group 20. The driving support system 10 may include the traveling device 30.

The control device 100 controls the vehicle 1. Typically, the control device 100 is a microcomputer mounted on the vehicle 1. The control device 100 is also referred to an electronic control unit (ECU). Alternatively, the control device 100 may be an information processing device outside the vehicle 1. In that case, the control device 100 communicates with the vehicle 1 and controls the vehicle 1 remotely.

The control device 100 includes a processor 110 and a storage device 120. The processor 110 executes various processes. Various types of information are stored in the storage device 120. Examples of the storage device 120 include a volatile memory, a non-volatile memory, and the like. When the processor 110 executes a control program that is a computer program, various processes executed by the processor 110 (control device 100) are realized. The control program is stored in the storage device 120 or recorded on a computer-readable recording medium.

1-3. Information Acquisition Process

The processor 110 (control device 100) executes an "information acquisition process" for acquiring driving environment information 200 indicating the driving environment of the vehicle 1. The driving environment information 200 is acquired based on the detection results of the sensor group 20 mounted on the vehicle 1. The acquired driving environment information 200 is stored in the storage device 120.

Figure 4:
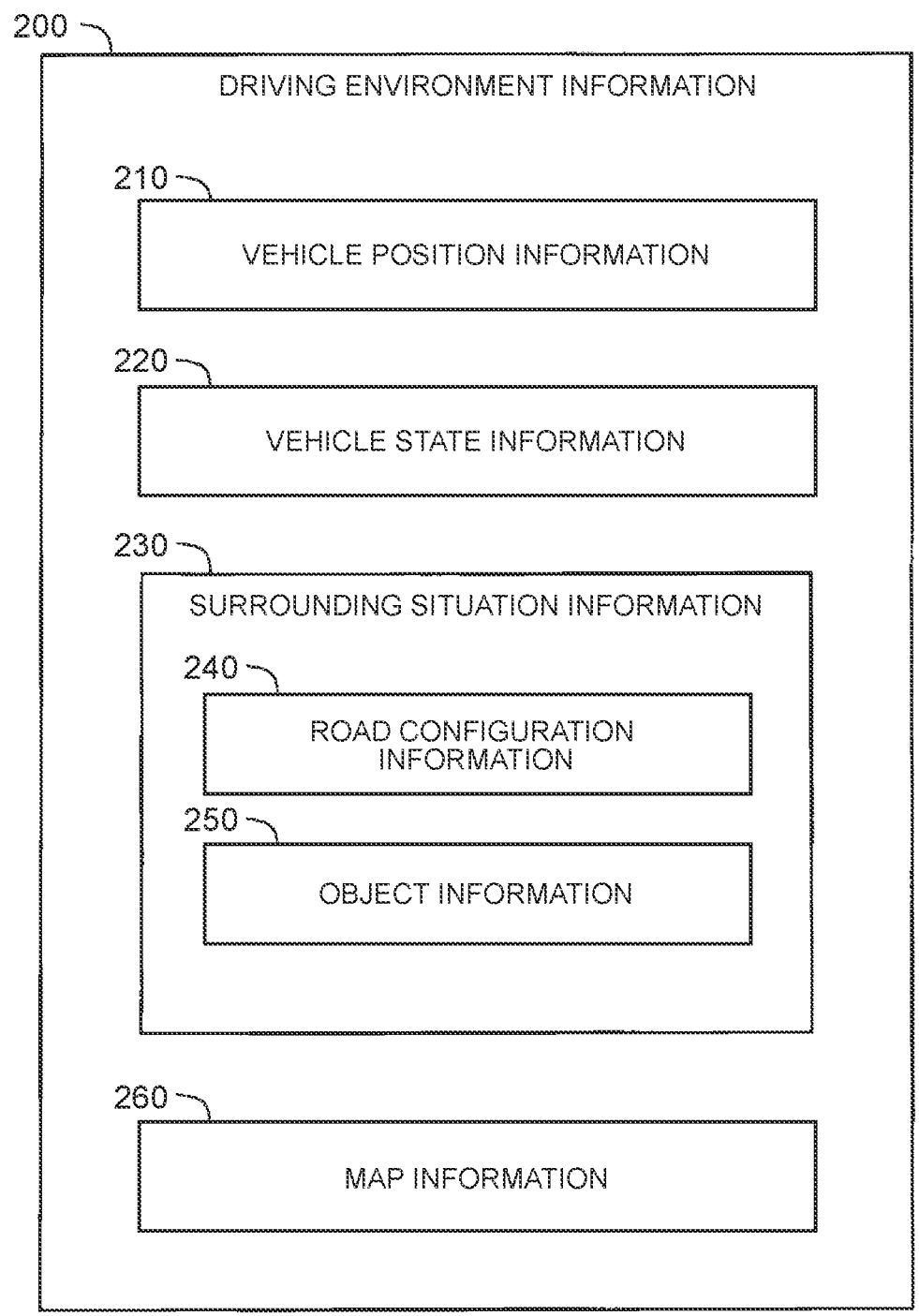
FIG. 4 is a block diagram showing an example of driving environment information according to the embodiment of the present disclosure.

FIG. 4 is a block diagram showing an example of the driving environment information 200. The driving environment information 200 includes vehicle position information 210, vehicle state information 220, surrounding situation information 230, map information 260, and the like.

The vehicle position information 210 is information indicating the position and the orientation of the vehicle 1 in the absolute coordinate system. The processor 110 acquires the vehicle position information 210 from the detection result of the position sensor 21.

The vehicle state information 220 is information indicating the state of the vehicle 1. Examples of the state of the vehicle 1 include a vehicle speed, a yaw rate, a lateral acceleration, a steering angle, and the like. The processor 110 acquires the vehicle state information 220 from the detection result of the vehicle state sensor 22.

The surrounding situation information 230 is information indicating the surrounding situation of the vehicle 1. The surrounding situation information 230 includes the information obtained by the recognition sensor 23. For example, the surrounding situation information 230 includes image information indicating the surrounding situation of the vehicle 1 captured by the camera. As another example, the surrounding situation information 230 includes measurement information measured by the radar or the LIDAR. Further, the surrounding situation information 230 includes road configuration information 240 and object information 250.

The road configuration information 240 is information regarding the road configuration around the vehicle 1. The road configuration around the vehicle 1 includes lane markings (white lines) and road edge objects. The road edge objects are three-dimensional obstacles that indicate the edge of the road. Examples of the road edge objects include curbs, guardrails, walls, median strips, and the like. The road configuration information 240 indicates at least the positions of the lane markings and the road edge objects (positions relative to the vehicle 1).

For example, by analyzing the image information obtained by the camera, the lane marking can be identified and the relative position of the lane marking can be calculated. Examples of the image analysis method include a semantic segmentation and an edge detection. Similarly, by analyzing the image information, the road edge object can be identified and the relative position of the road edge object can be calculated. Alternatively, the relative position of the road edge object can be acquired from radar measurement information.

The object information 250 is information regarding the object 5 around the vehicle 1. Examples of the object 5 include pedestrians, bicycles, two-wheeled vehicles, other vehicles (preceding vehicles, parked vehicles), and the like. The object information 250 indicates the relative position and the relative speed of the object with respect to the vehicle 1. For example, by analyzing the image information obtained by the camera, the object 5 can be identified and the relative position of the object 5 can be calculated. It is also possible to identify the object 5 and acquire the relative position and the relative speed of the object 5 based on the radar measurement information. The object information 250 may include the moving direction and the moving speed of the object 5. The moving direction and the moving speed of the object 5 can be calculated by tracking the position of the object 5. The object information 250 may indicate the type of the object 5 (pedestrian, bicycle, two-wheeled vehicle, other vehicle, etc.).

The map information 260 indicates a lane arrangement, a road shape, and the like. The control device 100 acquires the map information 260 of the required area from a map database. The map database may be stored in a predetermined storage device mounted on the vehicle 1, or may be stored in a management server outside the vehicle 1. In the latter case, the processor 110 communicates with the management server to acquire the necessary map information 260.

1-4. Vehicle Travel Control

The processor 110 (control device 100) executes a "vehicle travel control" that controls the traveling of the vehicle 1. The vehicle travel control includes a steering control for controlling the steering of the vehicle 1, an acceleration control for controlling the acceleration of the vehicle 1, and a deceleration control for controlling the deceleration of the vehicle 1. The processor 110 executes the vehicle travel control by controlling the traveling device 30. Specifically, the processor 110 executes the steering control by controlling the steering device 31. Further, the processor 110 executes the acceleration control by controlling the driving device 32. Further, the control device 100 executes the deceleration control by controlling the braking device 33.

1-5. Risk Avoidance Control

The processor 110 (control device 100) executes a driving support control that supports the driving of the vehicle 1. The driving support control includes a risk avoidance control. The risk avoidance control is a vehicle travel control for reducing (avoiding) the risk of collision with the object 5 in front of the vehicle 1, and includes at least one of the steering control and the deceleration control. The processor 110 executes the risk avoidance control based on the above-mentioned driving environment information 200.

Hereinafter, the risk avoidance control according to the present embodiment will be described in more detail.

2. Risk Potential Field

A "risk value R (risk potential)" is introduced as a value representing the risk related to the traveling of the vehicle. The risk value R is defined for each position. The position where the risk value R is high is a position where the vehicle 1 should avoid. A "risk potential field U" represents the risk value R as a function of position. In other words, the risk potential field U shows the distribution of the risk value R.

The "position" may be a position in the vehicle coordinate system (X, Y) or a position in the absolute coordinate system (latitude, longitude). Coordinate conversion between the absolute coordinate system and the vehicle coordinate system is possible based on the vehicle position information 210. In the following description, the position in the vehicle coordinate system and the position in the absolute coordinate system are treated as equivalent.

The risk avoidance control (steering control, deceleration control) according to the present embodiment is executed based on the risk potential field U. The components of the risk potential field U will be described below.

2-1. Obstacle Potential Field

Figure 5:
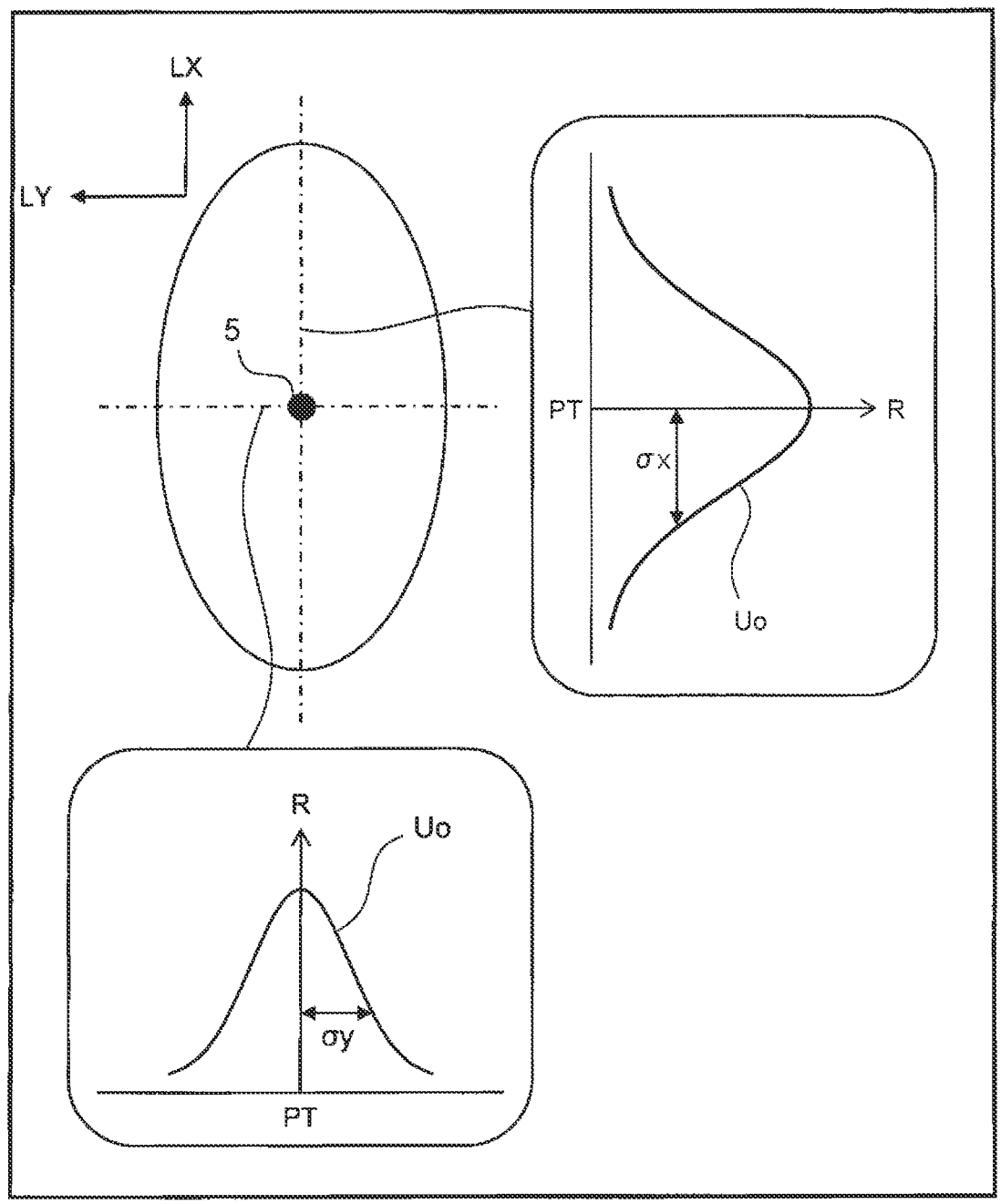
FIG. 5 is a conceptual diagram illustrating an obstacle potential field according to the embodiment of the present disclosure.

FIG. 5 is a conceptual diagram illustrating an obstacle potential field Uo.

The obstacle potential field Uo is a risk potential field U for restraining the vehicle 1 from approaching the object 5. Thus, the risk value R indicated by the obstacle potential field Uo becomes maximum at the position of the object 5, and decreases as the distance from the object 5 increases.

More specifically, the obstacle potential field Uo shows a two-dimensional distribution of the risk value R. FIG. 5 shows a profile of the distribution along each of the two main axis directions. The two main axis directions are the LX direction (lane longitudinal direction) and the LY direction (lane width direction). As another example, the two main axis directions may be the X direction and the Y direction. An object position PT is the position of the object 5. In each main axis direction, the risk value R becomes maximum at the object position PT and decreases as the distance from the object position PT increases. That is, the distribution of the risk value R has a mountain shape.

An obstacle potential function fo is a distribution function showing the distribution of the risk value R of the obstacle potential field Uo. For example, the obstacle potential function fo is a Gaussian function. In that case, the distribution is represented by a Gaussian distribution (normal distribution). The distribution parameters σx and σy are parameters respectively indicating the degree of spread of the distribution in the two main axis directions. When the distribution is a Gaussian distribution, the distribution parameters σx and σy are standard deviations.

The distribution parameters σx and σy may be different for each type of the object 5. For example, the distribution parameters σx and σy in the case where the object 5 is a pedestrian are larger than those in the case where the object 5 is another vehicle.

The distribution parameters σx and σy may vary depending on the vehicle speed of the vehicle 1. For example, as the vehicle speed increases, the distribution parameters σx and σy increase. In this case, the distribution parameters σx and σy are given in the map.

Potential function information 300 (see FIG. 3) indicates the obstacle potential function fo and the distribution parameters σx and σy. The potential function information 300 is generated in advance and stored in the storage device 120.

The processor 110 sets the obstacle potential field Uo related to the object 5. The position and the type of the object 5 can be obtained from the object information 250. The arrangement of the lane LA is obtained from the road configuration information 240 or the map information 260. The LX direction and the LY direction are obtained from the arrangement of the lane LA. The vehicle speed is obtained from the vehicle state information 220. Thus, the processor 110 can set the obstacle potential field Uo related to the object 5 based on the driving environment information 200 and the potential function information 300.

2-2. Vehicle Center Potential Field

Figure 6:
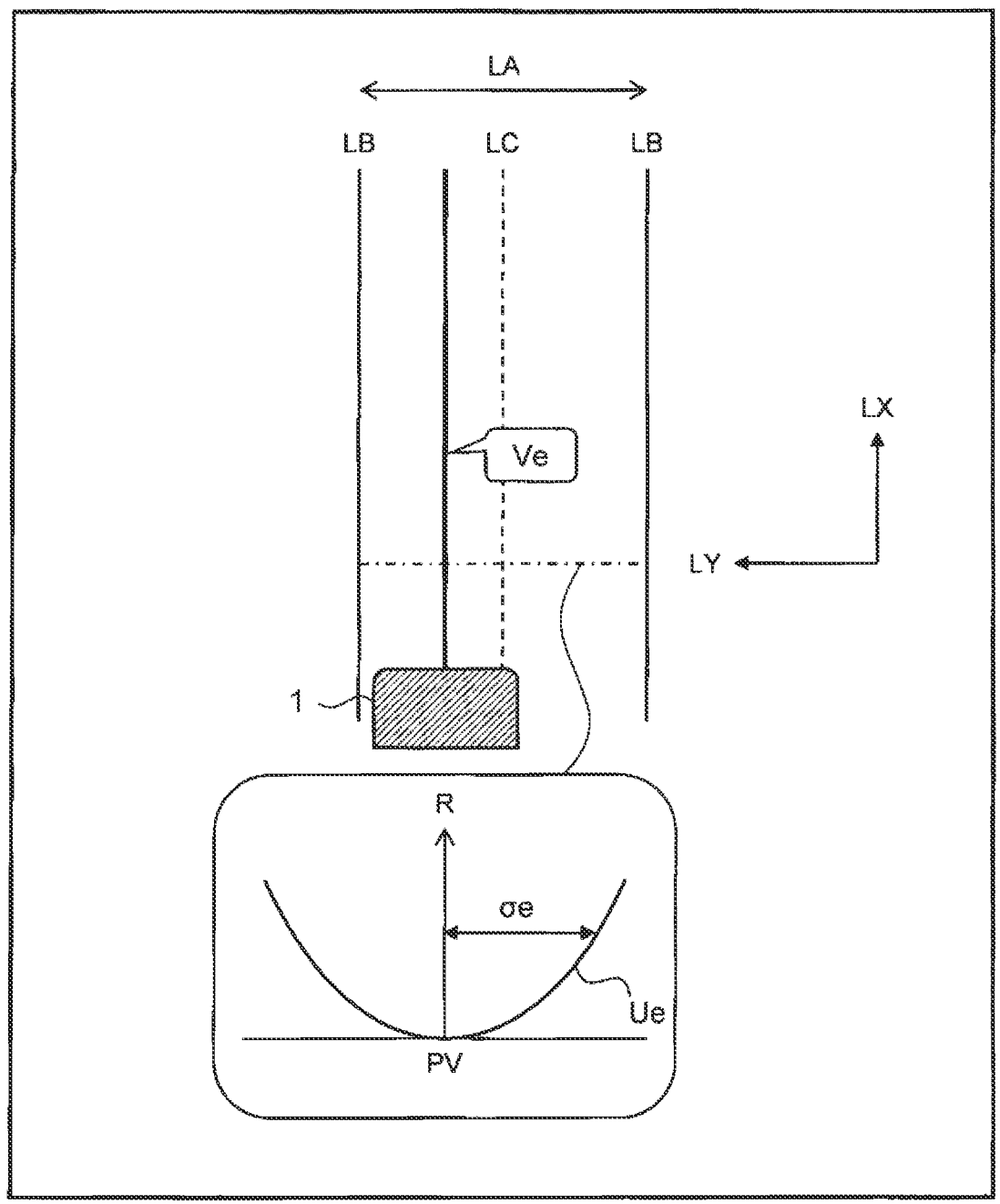
FIG. 6 is a conceptual diagram illustrating a vehicle center potential field according to the embodiment of the present disclosure.

FIG. 6 is a conceptual diagram illustrating a vehicle center potential field Ue. The lane LA in which the vehicle 1 is present is a region sandwiched between the right and left lane boundaries LBs (lane markings). The lane LA and the lane boundaries LB extend in the LX direction (lane longitudinal direction). The vehicle center potential field Ue is a risk potential field U for the vehicle 1 to travel along the lane LA. Thus, a "valley Ve" of the risk value R indicated by the vehicle center potential field Ue extends in the LX direction.

More specifically, the vehicle center potential field Ue shows a two-dimensional distribution of the risk value R. FIG. 6 shows a profile of the distribution along the LY direction (lane width direction). The vehicle lateral position PV is the position of the vehicle 1 in the LY direction. In the LY direction, the risk value R is the smallest at the vehicle lateral position PV and increases as the distance from the vehicle lateral position PV increases. That is, the distribution of the risk value has a U-shape. The position of the valley Ve of the risk value R coincides with the vehicle lateral position PV. The valley Ve extends in the LX direction from the position of the vehicle 1. That is, the position of the valley Ve is not fixed and dynamically changes with the position of the vehicle 1.

A vehicle center potential function fe is a distribution function showing the distribution of the risk value R of the vehicle center potential field Ue. For example, the vehicle center potential function fe is a quadratic curve. The distribution parameter σe is a parameter indicating the degree of spread of the distribution. The potential function information 300 (see FIG. 3) further indicates the vehicle center potential functions fe and the distribution parameter σe.

The processor 110 sets the vehicle center potential field Ue. The position of the vehicle 1 is obtained from the vehicle position information 210. The arrangement of the lane LA is obtained from the road configuration information 240 or the map information 260. The LX direction and the LY direction are obtained from the arrangement of the lane LA. Thus, the processor 110 can set the vehicle center potential field Ue based on the driving environment information 200 and the potential function information 300.

2-3. Lane Center Potential Field (Comparative Example)

Figure 7:
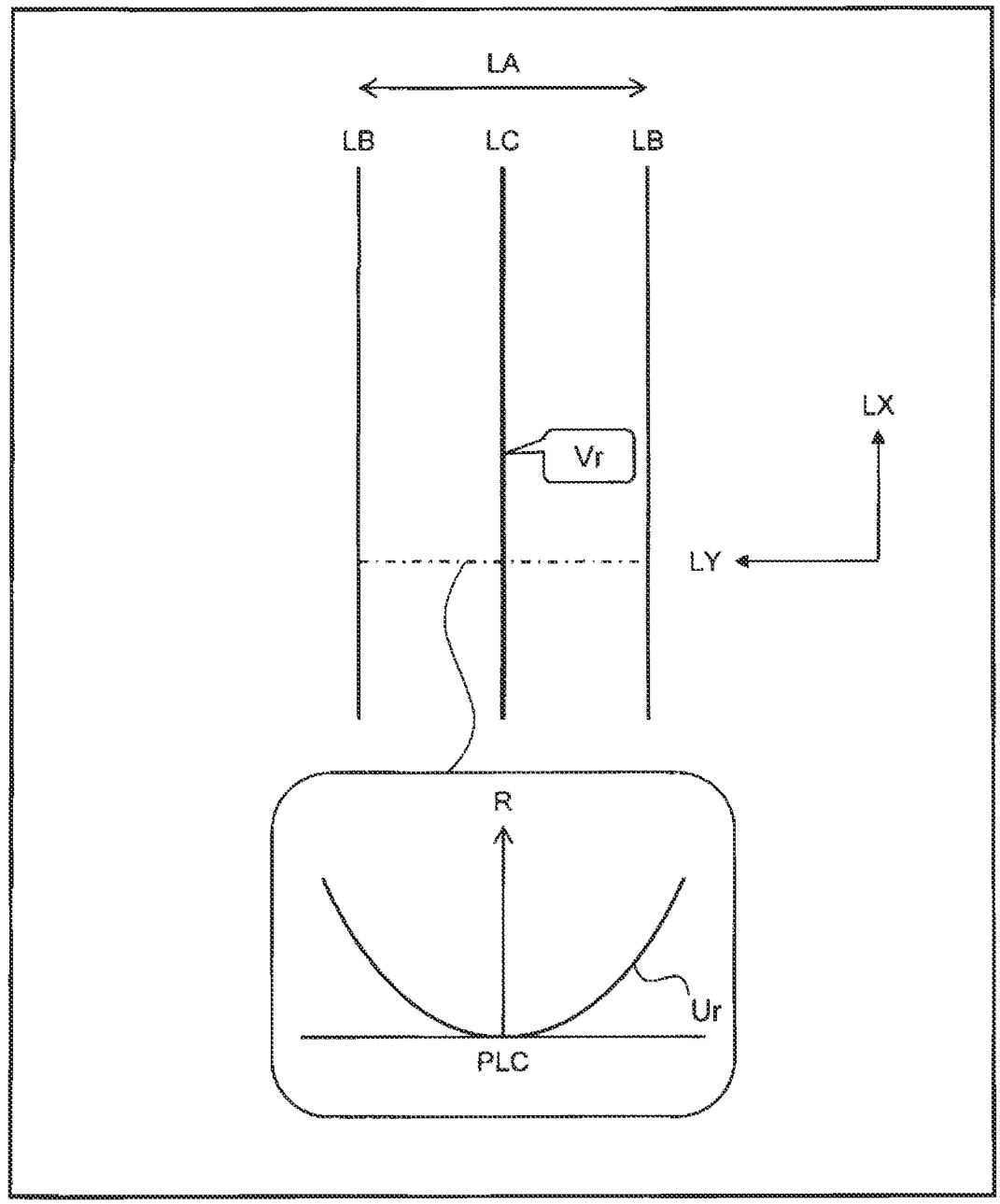
FIG. 7 is a conceptual diagram illustrating a lane center potential field used in a comparative example.

FIG. 7 shows a lane center potential field Ur as a comparative example. The lane center potential field Ur is a risk potential field U for the vehicle 1 to travel along a lane center LC. The "valley Vr" of the risk value R indicated by the lane center potential field Ur also extends in the LX direction. However, the position of the valley Vr is fixed to a lane center position PLC (the position of the lane center LC). That is, the position of the valley Vr of the lane center potential field Ur is fixed to the lane LA and does not change dynamically.

Figure 8:
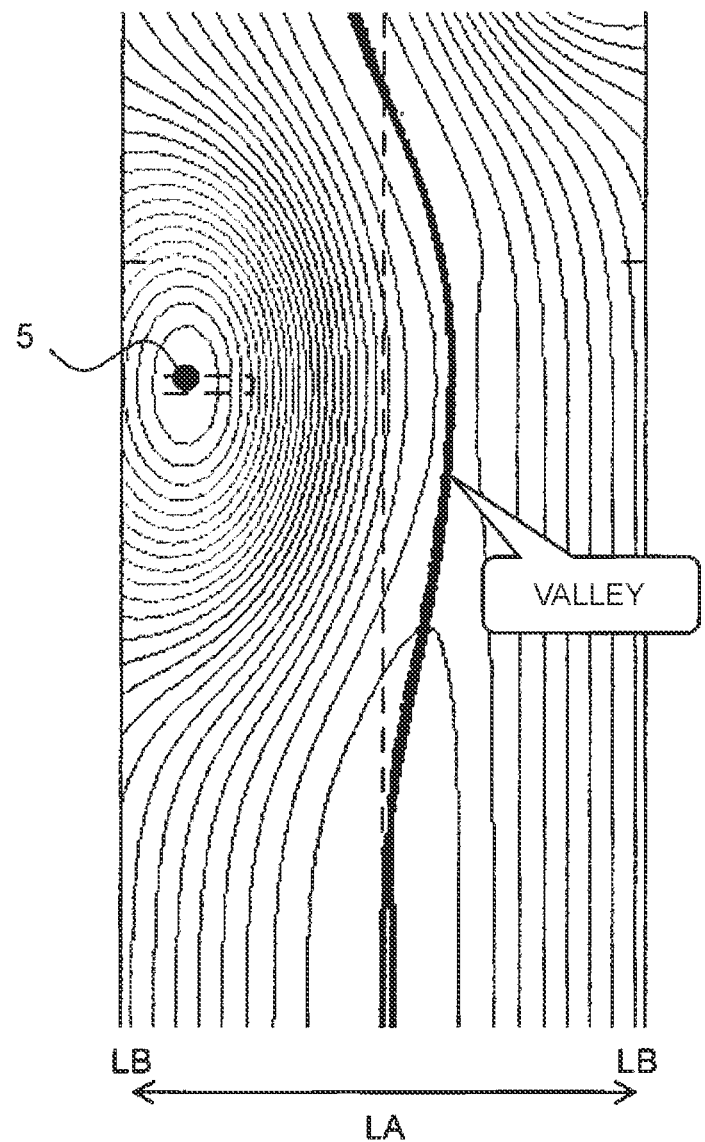
FIG. 8 is a conceptual diagram illustrating an overview of a steering control based on the risk potential field.

3. Steering Control Based on Risk Potential Field 3-1. Overview of Steering Control FIG. 8 is a conceptual diagram illustrating an overview of a steering control based on the risk potential field U. The risk potential field U as a whole is obtained by superimposing (adding) the components of the risk potential field U described above. When there are a plurality of objects 5, the obstacle potential fields Uo set for the respective objects 5 are superimposed.

In the risk potential field U, there is a "valley" of the risk value R. As shown in FIG. 8, the valley of the risk potential field U is located so as to extend in the LX direction as a whole while avoiding the object 5. By executing the steering control such that the vehicle 1 follows the valley of the risk potential field U, it is possible to drive the vehicle 1 while reducing the risk of collision with the object 5. That is, the risk avoidance control is realized.

However, there is room for improvement in the steering control based on the risk potential field U. This will be described with comparative examples.

3-2. Comparative Example

First, a comparative example will be described. A comparative risk potential field Uc used in the steering control according to the comparative example is represented by the following equation (1). The comparative risk potential field Uc is the sum of the lane center potential field Ur (see FIG. 7) and the obstacle potential field Uo[i]. The obstacle potential field Uo[i] is the obstacle potential field Uo for the object 5[$i$] ($i$=1 to n). Here, n is the total number of objects 5 that are focused as the subjects of the risk avoidance control, and is an integer of 1 or more.

Equation 1

$$Uc = Ur + \sum_{i}^{n} Uo[i] \qquad (1)$$

Figure 9:
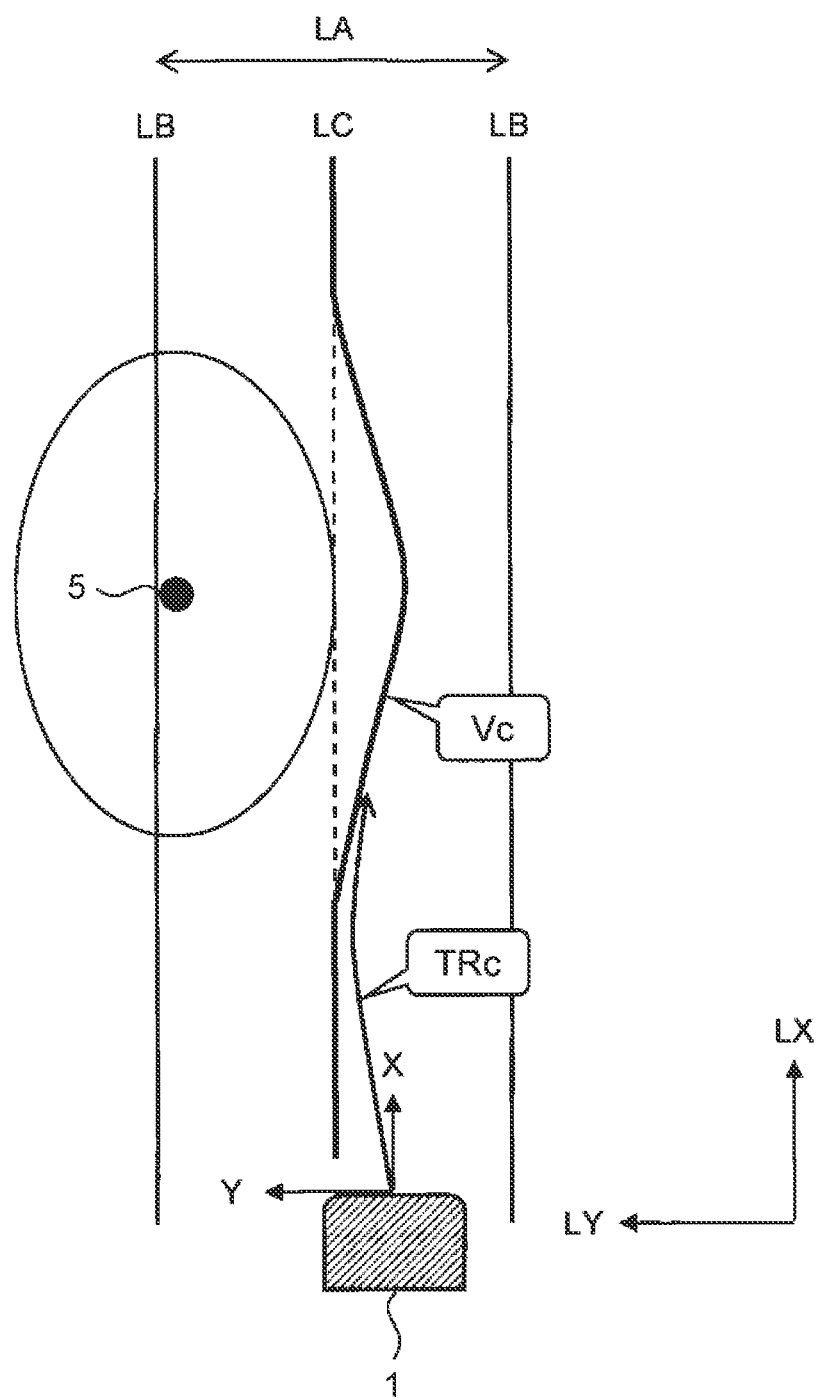
FIG. 9 is a conceptual diagram illustrating an example of the steering control according to the comparative example.

FIG. 9 shows an example of the steering control according to the comparative example. A valley Vc is a valley of the risk value R indicated by the comparative risk potential field Uc. The valley Vc is basically located on the lane center LC, but is shifted in the direction away from the object 5 near the object 5. The steering control is executed such that the vehicle 1 follows the valley Vc.

At an activation timing when the risk avoidance control function is activated, the vehicle 1 is located on the right side of the lane center LC, and the object 5 is located on the left side of the lane center LC. After the activation timing, the vehicle 1 is first steered in a direction approaching the lane center LC in order to follow the valley Vc. After that, when the vehicle 1 approaches the object 5, the valley Vc shifts to the right from the lane center LC, and the vehicle 1 is also steered to the right accordingly. That is, the vehicle 1 moves from side to side (see a trajectory TRc).

However, the steering control in the direction temporarily approaching the lane center LC causes a sense of discomfort as well as it is wasteful, from the viewpoint of avoiding the object 5. This is because the steering control in the direction approaching the lane center LC is a steering control in the direction approaching the object 5 to be avoided. An occupant (typically, the driver) of the vehicle 1 may feel uncomfortable with such unnecessary steering control.

In addition, there is a large lateral deviation between the position of the vehicle 1 and the position of the valley Vc at the activation timing. Therefore, at the activation timing, a leap in the steering control amount occurs. When a leap in the steering control amount occurs, sudden steering is executed.

Figure 10:
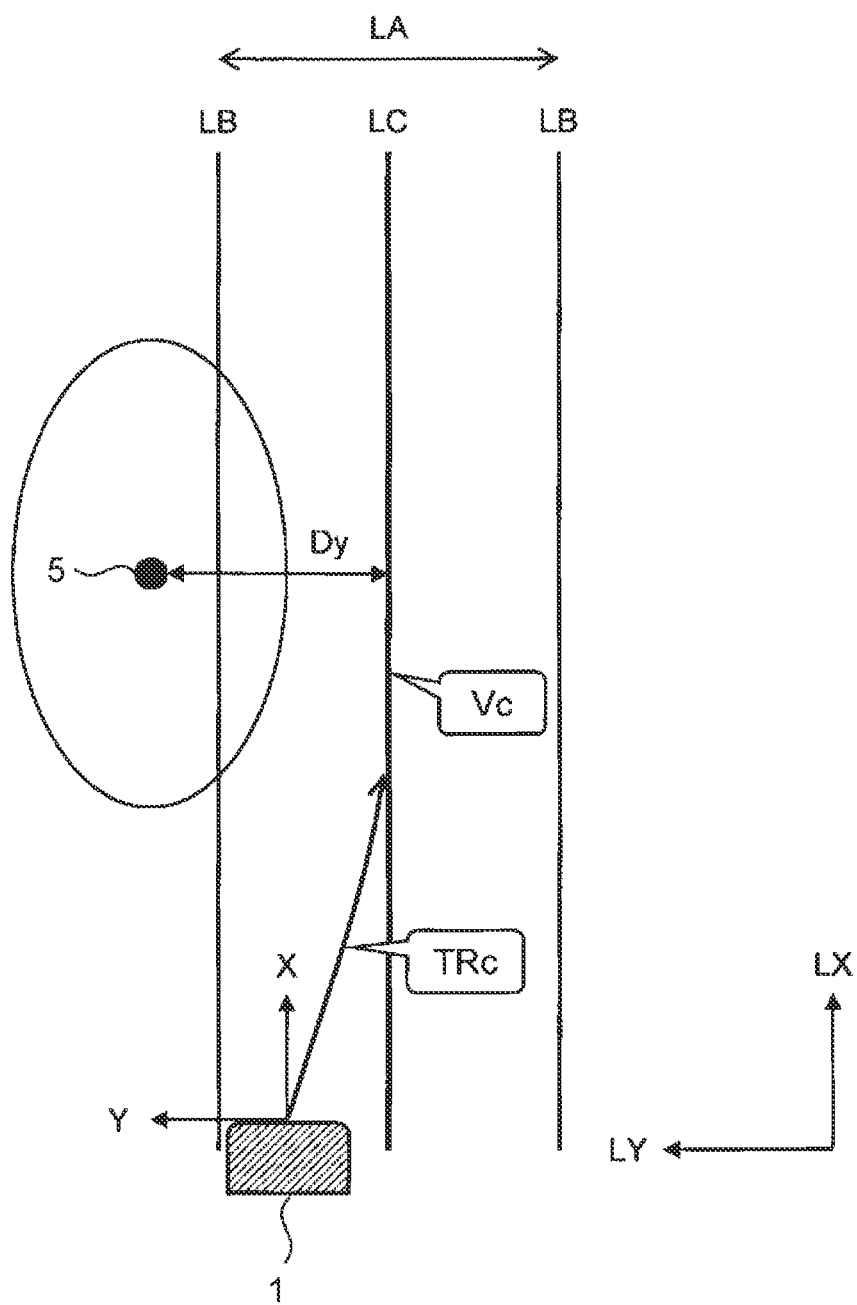
FIG. 10 is a conceptual diagram illustrating another example of the steering control according to the comparative example.

FIG. 10 shows another example of the steering control according to the comparative example. The object 5 is not located in the lane LA and is located relatively far from the lane center LC. Therefore, the valley Vc of the comparative risk potential field Uc is located substantially on the lane center LC. The steering control is executed such that the vehicle 1 follows the valley Vc.

At the activation timing when the risk avoidance control function is activated, the vehicle 1 is located on the left side of the lane center LC. After the activation timing, the vehicle 1 is steered in a direction approaching the lane center LC (see the trajectory TRc) in order to follow the valley Vc. After reaching the lane center LC, the vehicle 1 travels along the lane center LC. After that, the vehicle 1 passes by the object 5. A lateral distance Dy is the lateral distance between the vehicle 1 and the object 5 at the timing when the vehicle 1 passes by the object 5.

However, in the case of the example shown in FIG. 10, the risk of collision with the object 5 is sufficiently reduced even if the vehicle 1 does not move to the lane center LC. The steering control for moving the vehicle 1 to the lane center LC is excessive from the viewpoint of avoiding the object 5. In other words, the lateral distance Dy is excessive. The occupant (typically, the driver) of the vehicle 1 may feel uncomfortable with such excessive steering control.

As described above, in the case of the comparative example in which the lane center potential field Ur is applied, the steering control may be executed unnecessarily or excessively. This is because the valley Vc of the lane center potential field Ur is fixed to the lane center LC, and thus, a force that draws the vehicle 1 to the lane center LC is always generated. However, the force that draws the vehicle 1 to the lane center LC is for suppressing lane deviation, and is originally irrelevant to object avoidance. Since the lane center potential field Ur causes vehicle behavior that is not related to the object avoidance, the steering control serving as the risk avoidance control is executed unnecessarily or excessively. The occupant of the vehicle 1 may feel uncomfortable with such unnecessary steering control or excessive steering control.

3-3. Steering Control Using Vehicle Center Potential Field

Figure 11:
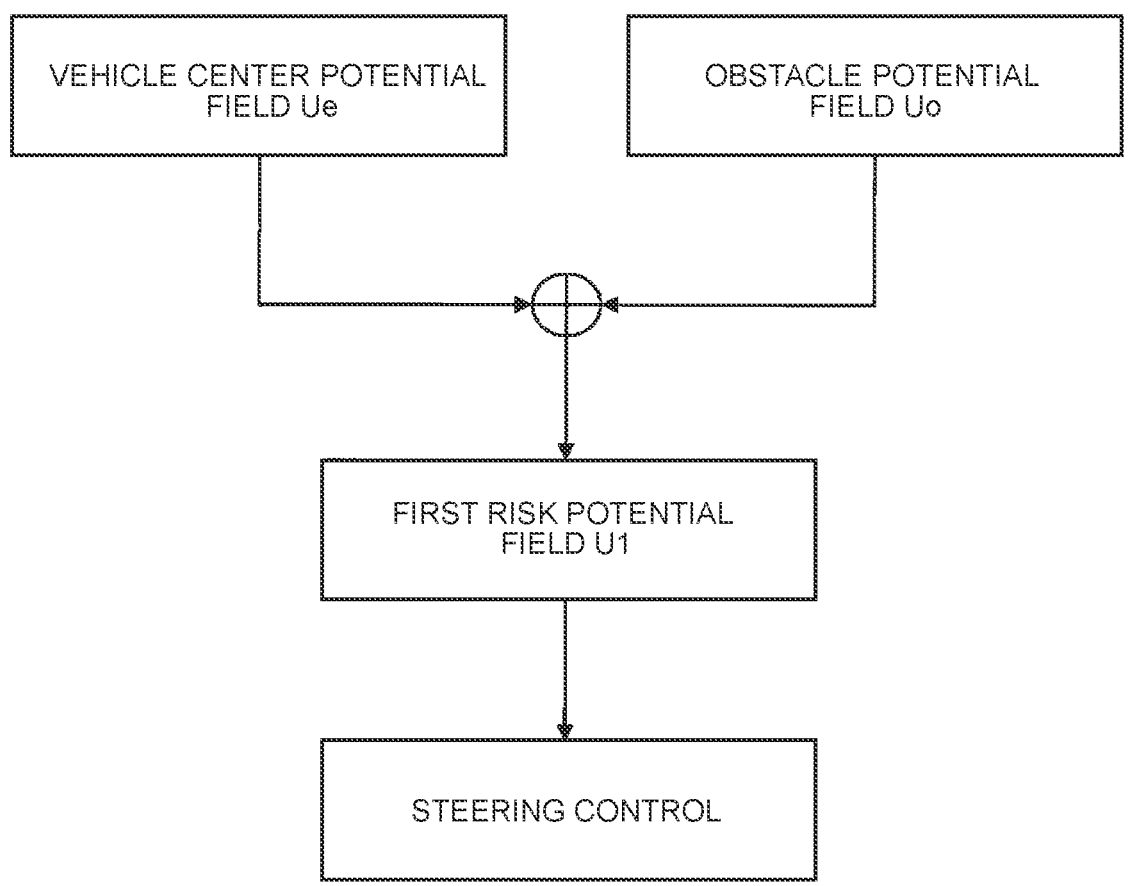
FIG. 11 is a block diagram illustrating an overview of the steering control according to the embodiment of the present disclosure.

FIG. 11 is a block diagram illustrating an overview of the steering control according to the present embodiment. According to the present embodiment, the vehicle center potential field Ue (see FIG. 6) is applied instead of the lane center potential field Ur. More specifically, a first risk potential field U1 used in the steering control according to the present embodiment is represented by the following equation (2). The first risk potential field U1 is the sum of the vehicle center potential field Ue and the obstacle potential field Uo[i].

Equation 2

$$U1 = Ue + \sum_{i}^{n} Uo[i] \quad (2)$$

A first valley V1 is a valley of the risk value R indicated by the first risk potential field U1. The processor 110 executes the steering control such that the vehicle 1 follows the first valley V1.

Figure 12:
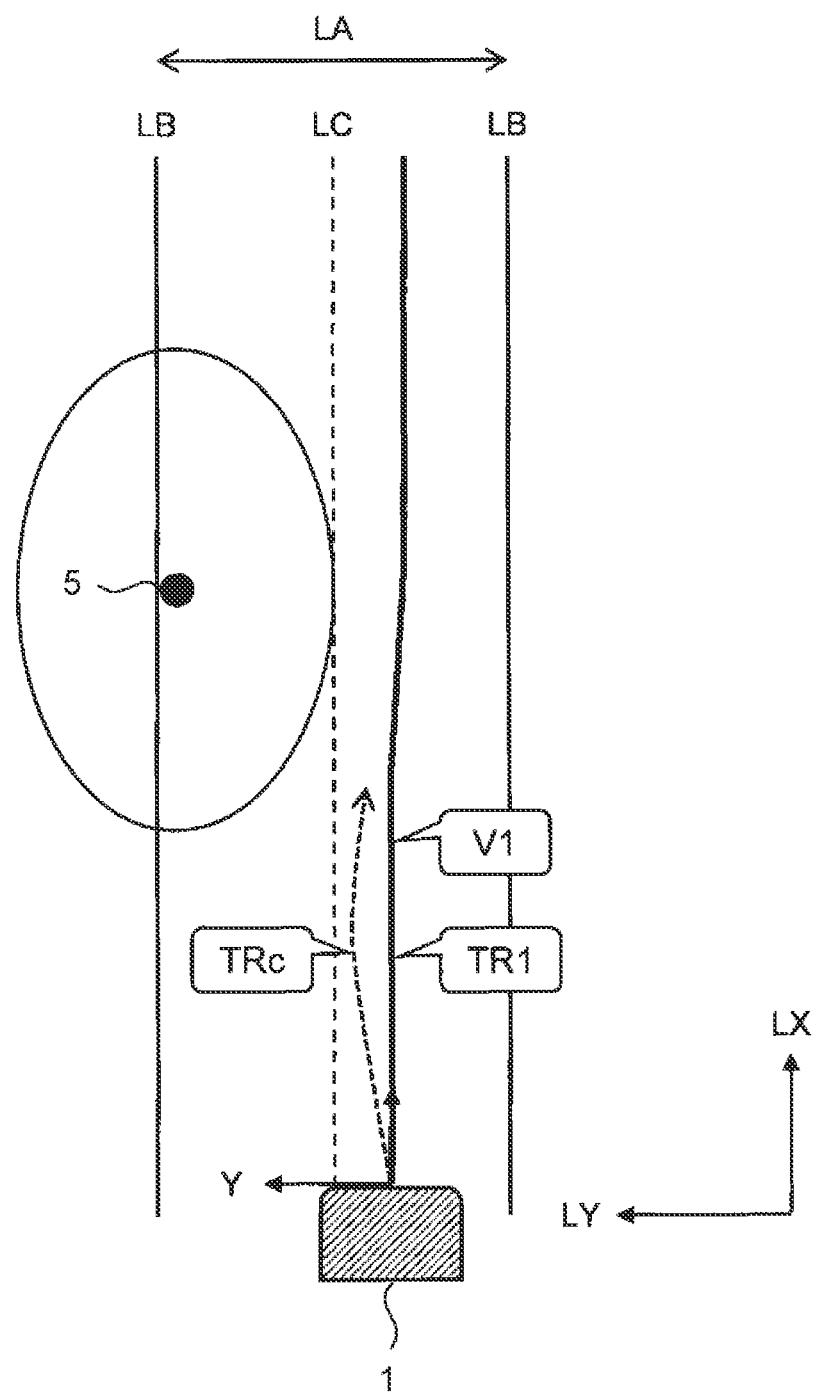
FIG. 12 is a conceptual diagram illustrating an example of the steering control according to the embodiment of the present disclosure.

FIG. 12 shows an example of the steering control according to the present embodiment. The positional relationship between the vehicle 1 and the object 5 at the activation timing is the same as that in the comparative example shown in FIG. 9. The first valley V1 extends in the LX direction from the position of the vehicle 1 and then shifts in a direction slightly away from the object 5. The vehicle 1 travels in the LX direction and is then steered in the direction away from the object 5 (see a trajectory TR1). When the lateral position of the vehicle 1 changes, the lateral position of the first valley V1 also changes accordingly. After that, the first valley V1 extends in the LX direction, and the vehicle 1 travels in the LX direction. As a result, the vehicle 1 travels substantially parallel to the LX direction from the position of the vehicle 1 without going from side to side.

Unlike the case of the comparative example shown in FIG. 9, the steering control in the direction temporarily approaching the lane center LC is not executed. That is, an unnecessary steering control in the direction approaching the object 5 to be avoided is not executed. Therefore, the discomfort felt by the occupant of the vehicle 1 is suppressed. Further, at the activation timing, there is no lateral deviation between the position of the vehicle 1 and the first valley V1. Therefore, a leap in the steering control amount is suppressed, and sudden steering is also suppressed.

Figure 13:
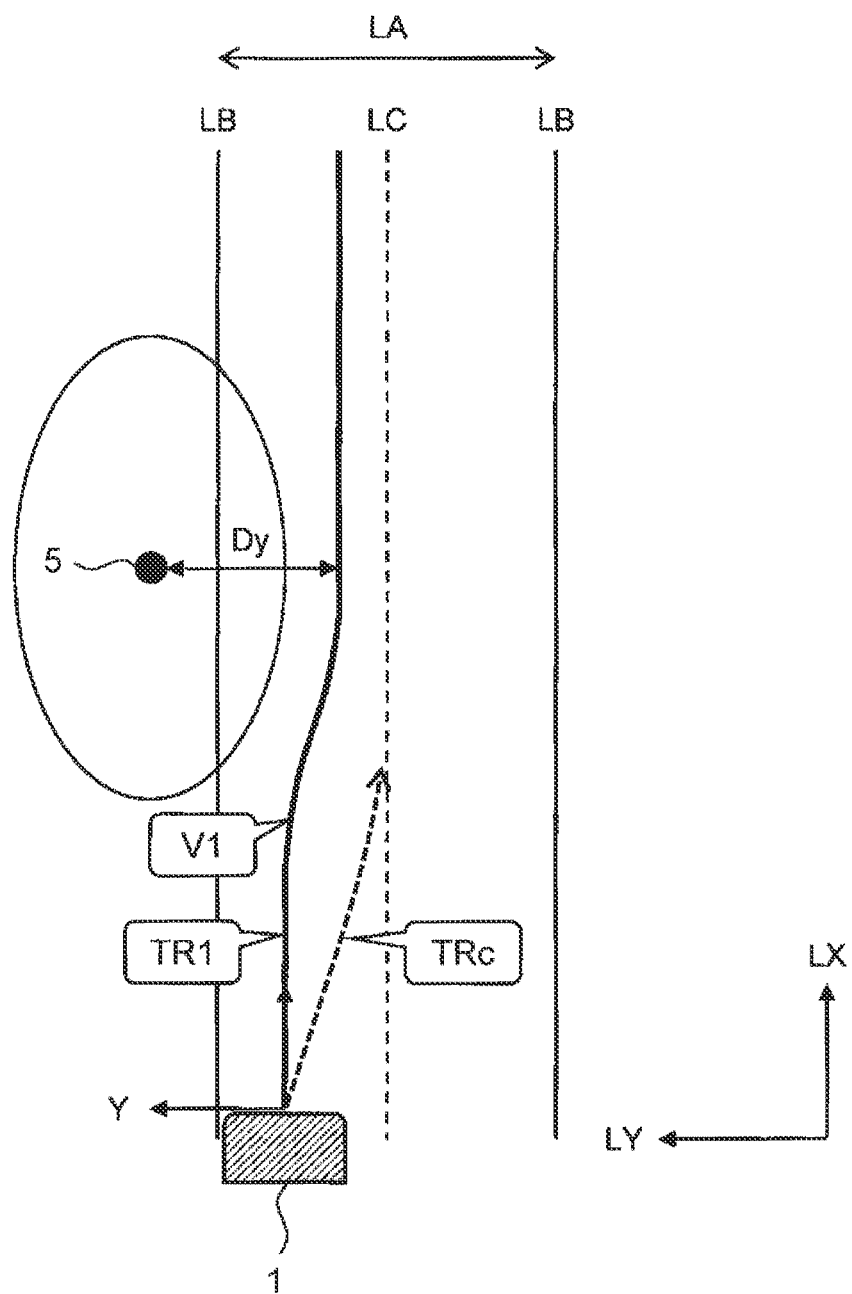
FIG. 13 is a conceptual diagram illustrating another example of the steering control according to the embodiment of the present disclosure.

FIG. 13 shows another example of the steering control according to the present embodiment. The positional relationship between the vehicle 1 and the object 5 at the activation timing is the same as that in the comparative example shown in FIG. 10. The first valley V1 extends in the LX direction from the position of the vehicle 1 and then shifts in a direction away from the object 5. The vehicle 1 first travels in the LX direction and is then steered in the direction away from the object 5 (trajectory TR1). When the lateral position of the vehicle 1 changes, the lateral position of the first valley V1 also changes accordingly. After that, the first valley V1 extends in the LX direction, and the vehicle 1 travels in the LX direction. The first valley V1 (trajectory TR1) as a whole is located more toward the object 5 than the lane center LC.

Unlike the case of the comparative example shown in FIG. 10, the vehicle 1 does not move to the lane center LC. The vehicle 1 passes by the object 5 at an appropriate lateral distance Dy. That is, an excessive steering control is not executed in order to avoid the object 5. Therefore, the discomfort felt by the occupant of the vehicle 1 is suppressed.

Thus, according to the present embodiment, the vehicle center potential field Ue is applied to the steering control, rather than the lane center potential field Ur. The valley Ve of the vehicle center potential field Ue extends in the LX direction from the position of the vehicle 1. The position of the valley Ve of the vehicle center potential field Ue is not fixed and dynamically changes with the position of the vehicle 1. Therefore, unlike the case of the lane center potential field Ur, a force that draws the vehicle 1 to the lane center LC regardless of the object avoidance is not generated. As a result, it is possible to suppress an unnecessary or excessive steering control. Suppressing an unnecessary steering control or an excessive steering control means that appropriate vehicle behavior is realized for avoiding risks. Therefore, the discomfort felt by the occupant of the vehicle 1 is suppressed. This contributes to the improvement of reliability of the driving support system 10.

3-4. Process Flow

Figure 14:
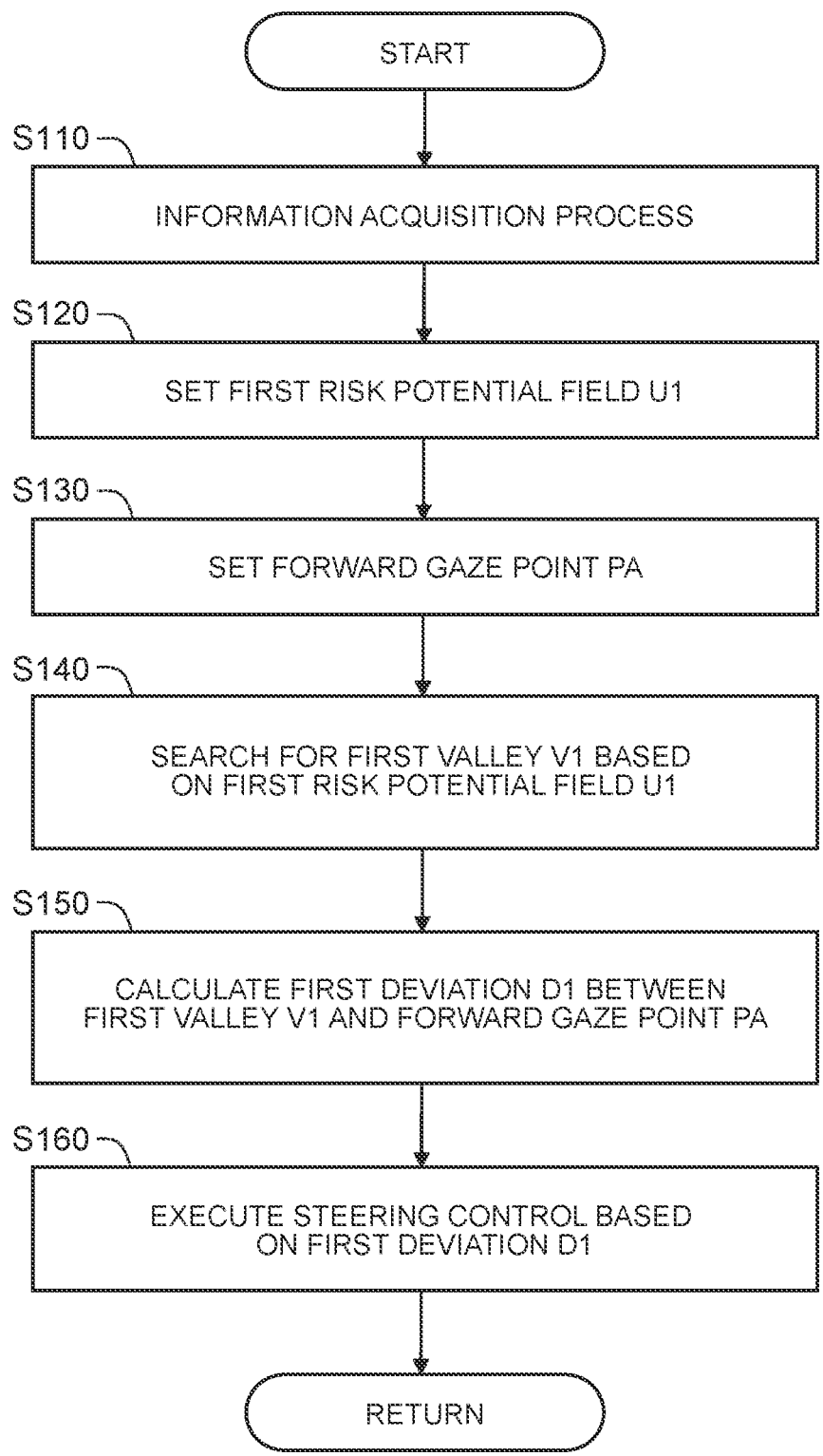
FIG. 14 is a flowchart showing a process related to the steering control according to the embodiment of the present disclosure.

FIG. 14 is a flowchart showing a process related to the steering control according to the present embodiment. The process flow shown in FIG. 14 is repeatedly executed at regular cycles.

3-4-1. Step S110

In step S110, the processor 110 executes the above-mentioned information acquisition process. That is, the processor 110 acquires the driving environment information 200 based on the detection result of the sensor group 20. The driving environment information 200 is stored in the storage device 120.

3-4-2. Step S120

In step S120, the processor 110 sets the first risk potential field U1. The first risk potential field U1 is the sum of the vehicle center potential field Ue and the obstacle potential field Uo[i] (see equation (2)). As described, the processor 110 sets the vehicle center potential field Ue based on the driving environment information 200 and the potential function information 300. Further, the processor 110 sets the obstacle potential field Uo[i] for each object 5 based on the driving environment information 200 and the potential function information 300. The processor 110 sets the sum of the vehicle center potential field Ue and the obstacle potential field Uo[i] as the first risk potential field U1.

Figure 15:
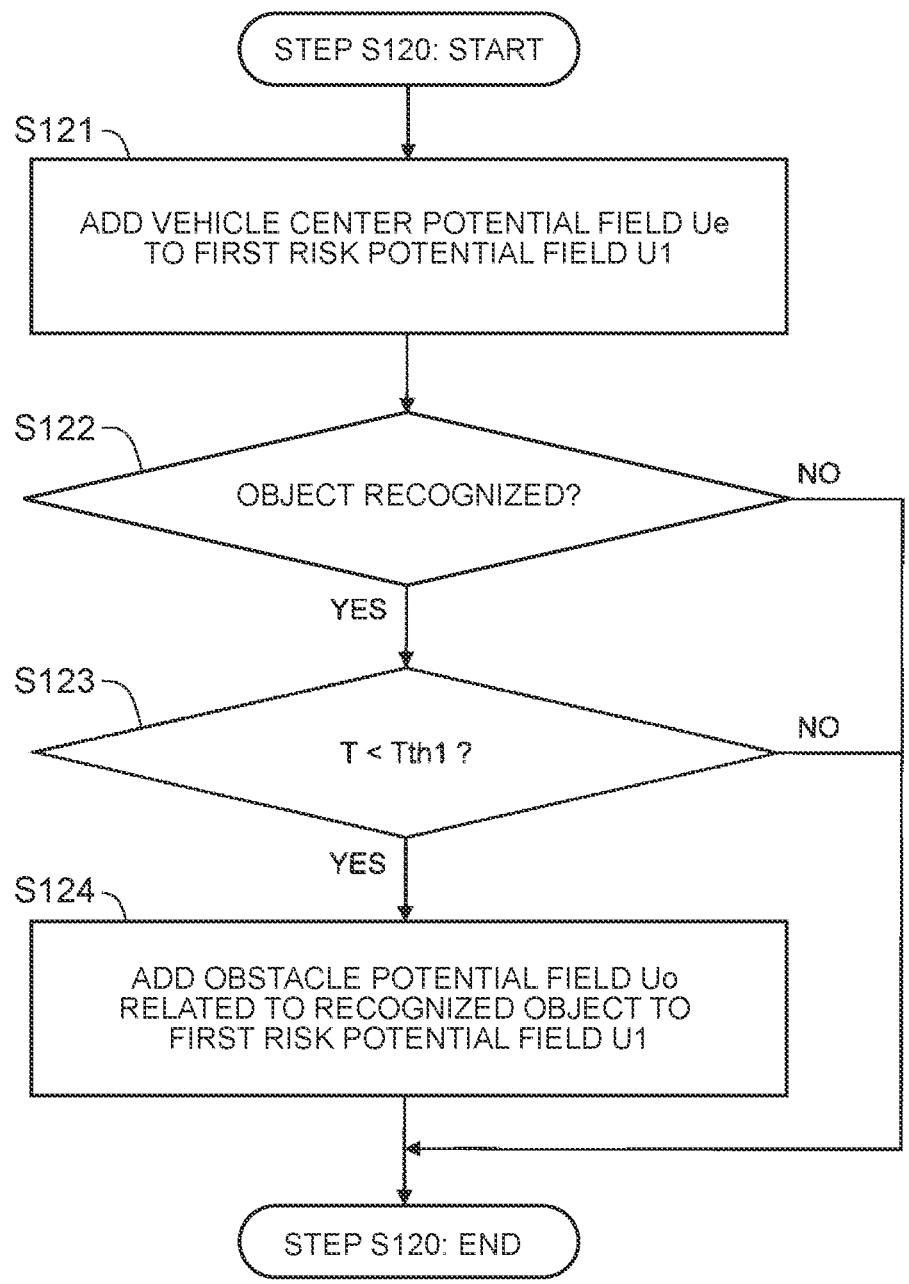
FIG. 15 is a flowchart showing a process example in step S120 in FIG. 14.

FIG. 15 is a flowchart showing a process example in step S120.

In step S121, the processor 110 sets the vehicle center potential field Ue based on the driving environment information 200 and the potential function information 300. Then, the processor 110 adds the vehicle center potential field Ue to the first risk potential field U1.

In step S122, the processor 110 determines whether there is the object 5 in front of the vehicle 1 based on the object information 250. In other words, the processor 110 determines whether the object 5 is recognized in the region in front of the vehicle 1. When the object 5 in front of the vehicle 1 is recognized (step S122; Yes), the process proceeds to step S123. Otherwise (step S122; No), step S120 ends.

In step S123, the processor 110 determines whether a margin time T to the recognized object 5 is less than a first time threshold value Tth1.

Figure 16:
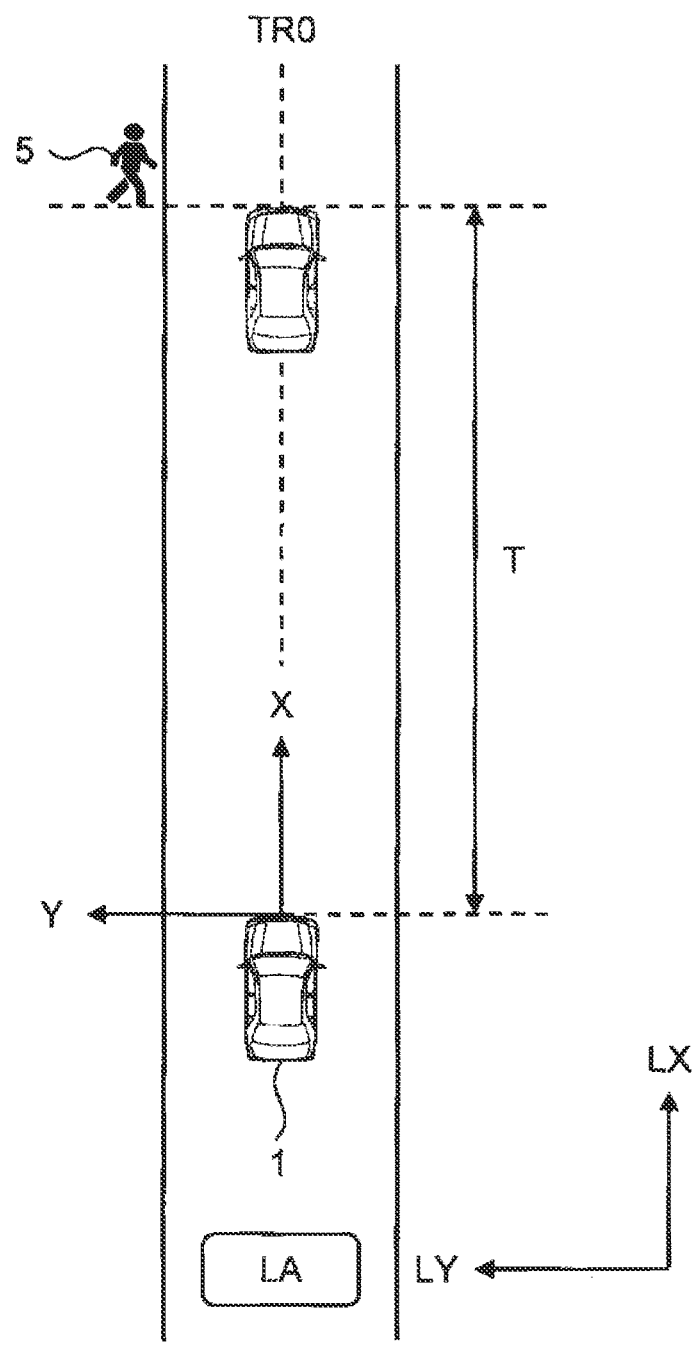
FIG. 16 is a conceptual diagram illustrating a margin time to an object.

The margin time T will be described with reference to FIG. 16. The trajectory TR0 represents the trajectory of the vehicle 1 when the risk avoidance control is not executed. The vehicle 1 is assumed to travel in the LX direction at the current vehicle speed. The margin time T is the time until the vehicle 1 comes closest to the object 5 under the above assumption. Typically, the timing at which the vehicle 1 comes closest to the object 5 is the timing at which the vehicle 1 passes by the object 5. The current vehicle speed of the vehicle 1 is obtained from the vehicle state information 220. The position of the object 5 is obtained from the object information 250. The arrangement of the lane LA and the LX direction can be obtained from the road configuration information 240 or the map information 260. Thus, the processor 110 can calculate the margin time T based on the driving environment information 200.

When the margin time T is less than the first time threshold value Tth1 (step S123; Yes), the process proceeds to step S124. Otherwise (step S123; No), step S120 ends.

In step S124, the processor 110 sets the obstacle potential field Uo related to the recognized object 5 based on the driving environment information 200 and the potential function information 300. Then, the processor 110 adds the obstacle potential field Uo to the first risk potential field U1. Thus, when the vehicle 1 approaches the object 5 to some extent, the obstacle potential field Uo related to the object 5 is added to the first risk potential field U1.

3-4-3. Step S130

In step S130, the processor 110 sets a forward gaze point PA at a position in front of the vehicle 1.

The forward gaze point PA will be described with reference to FIG. 17.

The forward gaze point PA is set at a position in front of the vehicle 1 by a first distance S along the traveling direction of the vehicle 1 (X direction). The traveling direction of the vehicle 1 is obtained from the vehicle position information 210. The first distance S is a constant value. Alternatively, the first distance S may vary depending on the vehicle speed of the vehicle 1. In that case, the first distance S increases as the vehicle speed increases. The vehicle speed is obtained from the vehicle state information 220.

3-4-4. Step S140

In step S140, the processor 110 searches for the first valley V1 based on the first risk potential field U1. In particular, the processor 110 searches for the first valley V1 in the vicinity of the forward gaze point PA.

Figure 17:
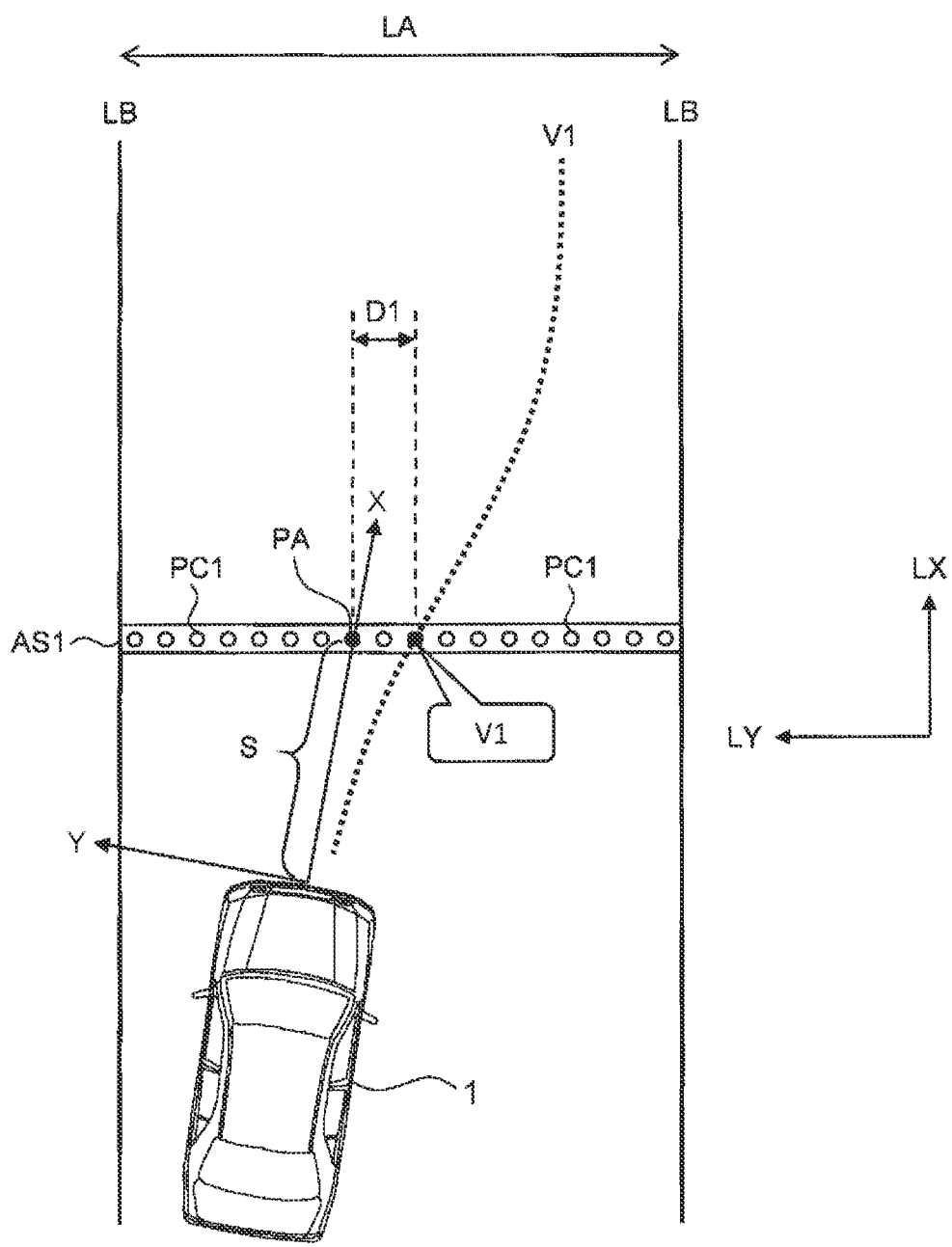
FIG. 17 is a conceptual diagram illustrating the steering control according to the embodiment of the present disclosure.

More specifically, the processor 110 sets a first search range AS1 as shown in FIG. 17. The first search range AS1 is a range extending in the LY direction (lane width direction) from the forward gaze point PA. The first search range AS1 is set to cover at least the range of the lane LA in the LY direction. Then, the processor 110 searches for the first valley V1 in the first search range AS1.

For example, the processor 110 sets a plurality of checkpoints PC1 in the first search range AS1. The processor 110 calculates the risk value R at each checkpoint PC1 with reference to the first risk potential field U1. By substituting the position of each checkpoint PC1 into the potential functions (fe, fo) constituting the first risk potential field U1, the risk value R at each checkpoint PC1 can be calculated. Then, the processor 110 determines the checkpoint PC1 at which the risk value R is the minimum as the first valley V1.

Thus, the first valley V1 is searched for in the first search range AS1 in the vicinity of the forward gaze point PA. It is not necessary to calculate the risk value R over the entire lane LA to search for the first valley V1. Therefore, the calculation load required for searching for the first valley V1 is significantly reduced.

3-4-5. Step S150

In step S150, the processor 110 calculates a first deviation D1. The first deviation D1 is a deviation in the LY direction between the forward gaze point PA and the first valley V1.

3-4-6. Step S160

In step S160, the processor 110 executes a steering control such that the first deviation D1 is reduced. Specifically, the processor 110 calculates a target steering angle θt required for reducing the first deviation D1. Typically, the larger the first deviation D1, the larger the target steering angle θt. A function (e.g., map) showing the correspondence between the first deviation D1 and the target steering angle θt is generated in advance. The processor 110 calculates the target steering angle θt in accordance with the first deviation D1 by referring to the function.

Then, the processor 110 executes a steering control according to the target steering angle θt. The actual steering angle of the vehicle 1 is obtained from the vehicle state information 220. The processor 110 controls the steering device 31 to steer the wheels such that the target steering angle θt is realized. Such steering control enables the vehicle 1 to follow the first valley V1 of the first risk potential field U1.

3-5. Lane Departure Suppression

Figure 18:
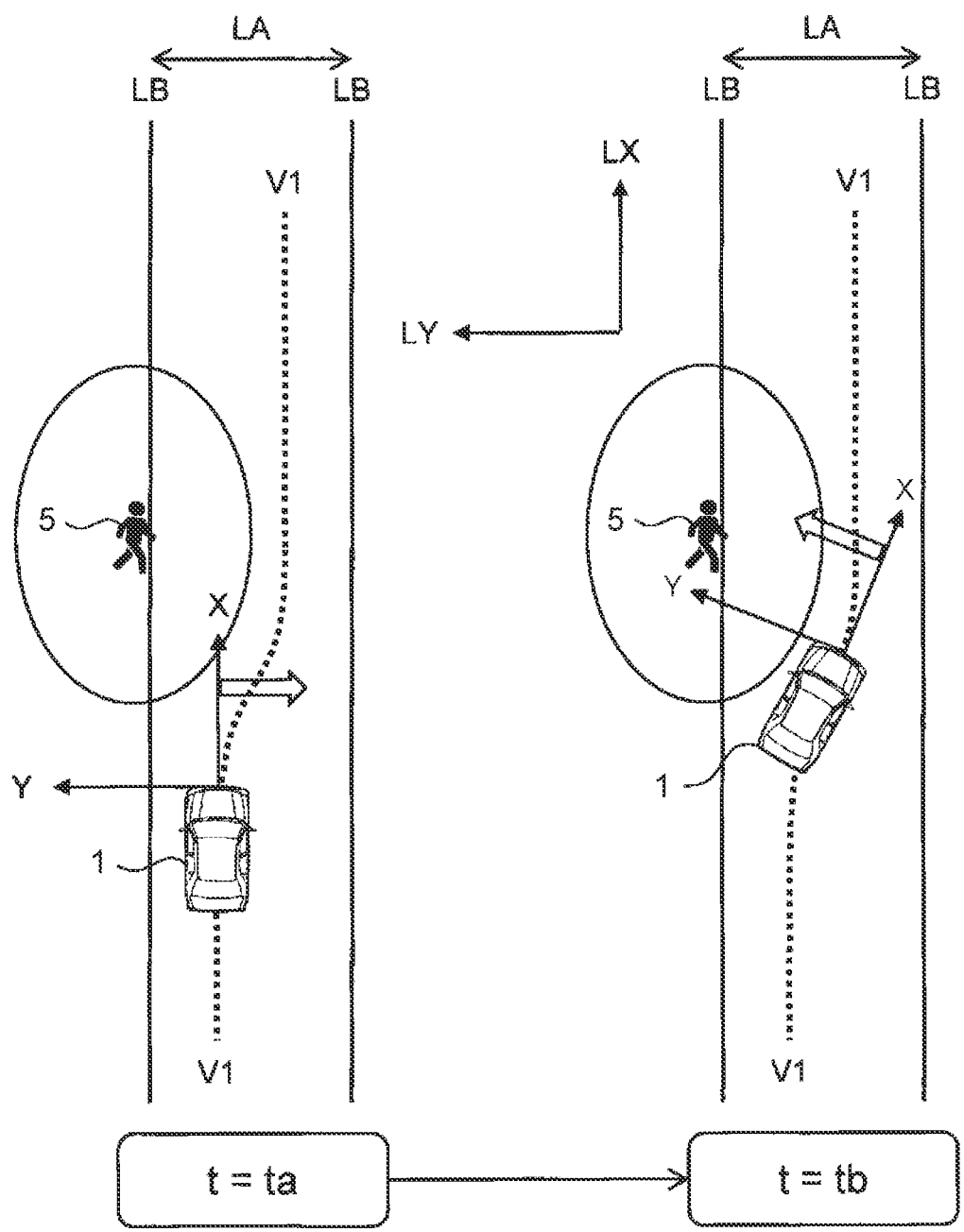
FIG. 18 is a conceptual diagram illustrating the steering control according to the embodiment of the present disclosure.

The reason why lane departure is suppressed in the present embodiment will be described with reference to FIG. 18. As described above, the forward gaze point PA is set at a position in the traveling direction of the vehicle 1 (X direction). At a timing ta, the first valley V1 in front of the vehicle 1 is shifted in the direction to avoid the object 5. At the timing ta, the forward gaze point PA is located on the left side of the first valley V1. The steering direction to reduce the first deviation D1 is the right direction. Therefore, the vehicle 1 turns to the right. When the vehicle 1 turns to the right, the forward gaze point PA also turns to the right.

At a timing tb after the vehicle 1 turns to the right, the forward gaze point PA is located on the right side of the first valley V1. The steering direction to reduce the first deviation D1 is the left direction. Therefore, a return steering force that restores the traveling direction of the vehicle 1 is generated. As a result, the vehicle 1 returns to the traveling state parallel to the lane LA without departing from the lane LA. Thus, since the forward gaze point PA is set at the position in the traveling direction of the vehicle 1 (X direction), the vehicle 1 is suppressed from departing from the lane LA.

3-6. Effect

As described above, according to the present embodiment, the first risk potential field U1 is applied to the steering control of the risk avoidance control. Specifically, the steering control is executed so as to follow the first valley V1 of the first risk potential field U1.

The first risk potential field U1 includes the vehicle center potential field Ue for the vehicle 1 to travel along the lane LA. The valley Ve of the vehicle center potential field Ue extends in the LX direction (lane longitudinal direction) from the position of the vehicle 1. Further, the position of the valley Ve of the vehicle center potential field Ue is not fixed and dynamically changes with the position of the vehicle 1. Since such a valley Ve is incorporated in the first valley V1, an unnecessary steering control or an excessive steering control is suppressed (see FIGS. 12 and 13).

Suppressing an unnecessary steering control or an excessive steering control means that appropriate vehicle behavior is realized for avoiding risks. Therefore, the discomfort felt by the occupant of the vehicle 1 is suppressed. This contributes to the improvement of reliability of the driving support system 10.

Moreover, the risk potential field U is capable of superimposing. A plurality of obstacle potential fields Uo for a plurality of object 5 are superimposed and incorporated into the first risk potential field U1. That is, in the first risk potential field U1, the risks related to the objects 5 are incorporated in an integrated manner. By using such a first risk potential field U1, it becomes possible to grasp the risks more accurately, and it becomes possible to execute the risk avoidance control more appropriately.

Further, according to the present embodiment, the target steering angle θt (trajectory TR1) of the vehicle 1 is uniquely determined from the first risk potential field U1. As a comparative example, a method of generating multiple types of target trajectories and selecting an optimum target trajectory from them will be discussed. In the case of this comparative example, it is necessary to evaluate each target trajectory using an evaluation function, which increases the calculation load. In particular, in a situation where there is a plurality of the objects 5, the evaluation function becomes complicated and the calculation load markedly increases. On the other hand, according to the present embodiment, such an evaluation function is unnecessary, so the calculation load is reduced. As the number of the objects 5 increases, the effect of reducing the calculation load becomes more remarkable.

Figure 19:
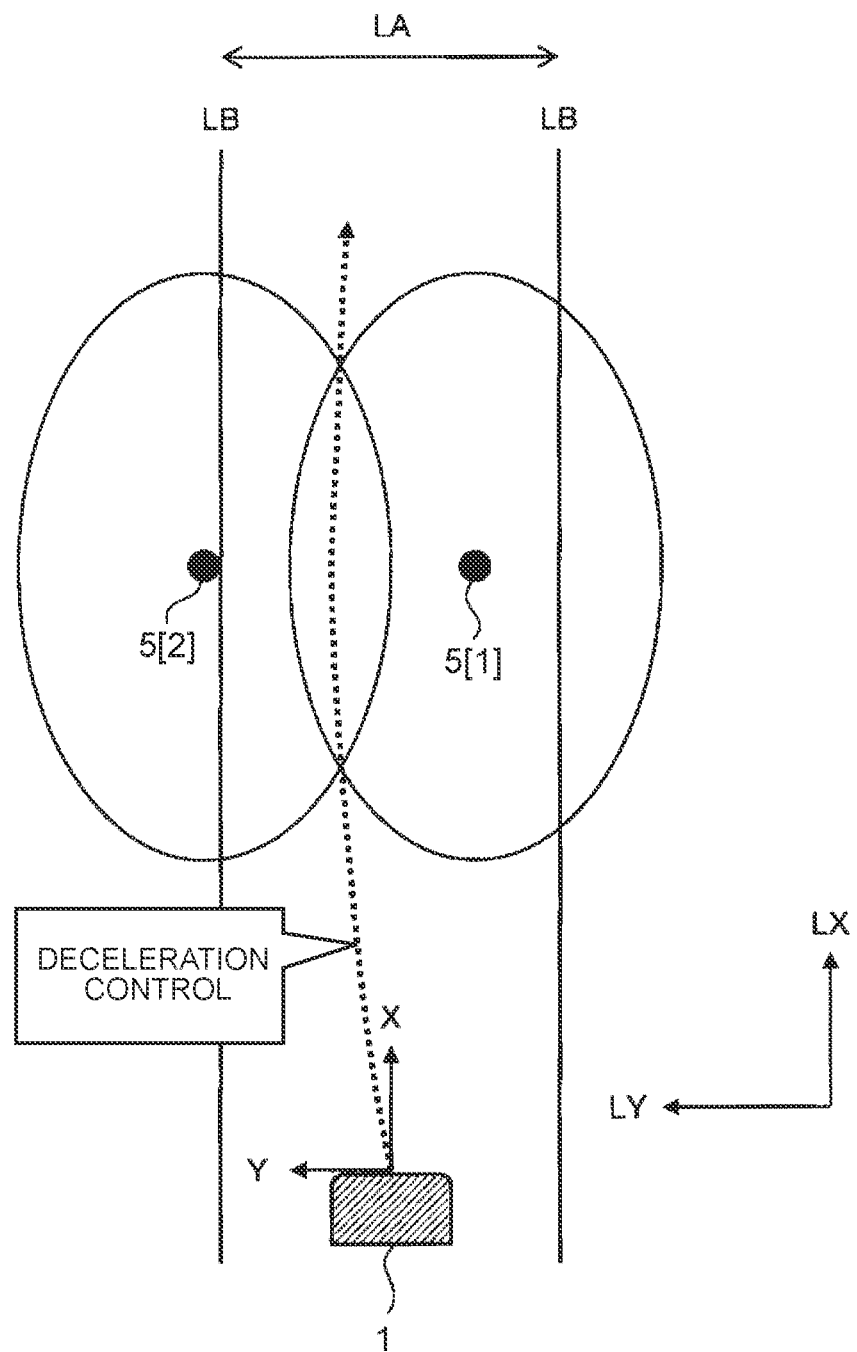
FIG. 19 is a conceptual diagram illustrating an overview of a deceleration control according to the embodiment of the present disclosure.

4. Deceleration Control Based on Risk Potential Field 4-1. Overview of Deceleration Control FIG. 19 is a conceptual diagram illustrating the deceleration control based on the risk potential field U. In FIG. 19, two objects 5[1] and 5[2] in front of the vehicle 1 are shown. These two objects 5[1] and 5[2] are located relatively close to each other. In such a situation, even if the above-mentioned steering control is activated, the vehicle 1 passes by relatively close to the objects 5[1] and 5[2]. As a result, the risk of collision with the object 5[1] is not sufficiently reduced, and the occupant of the vehicle 1 may feel uneasy.

Therefore, in the situation illustrated in FIG. 19, it is conceivable to execute a deceleration control instead of the steering control or together with the steering control. The concept of "suppression amount" will be introduced as a criterion for determining under what circumstances the deceleration control should be executed and at what degree of deceleration the deceleration control should be executed.

Figure 20:
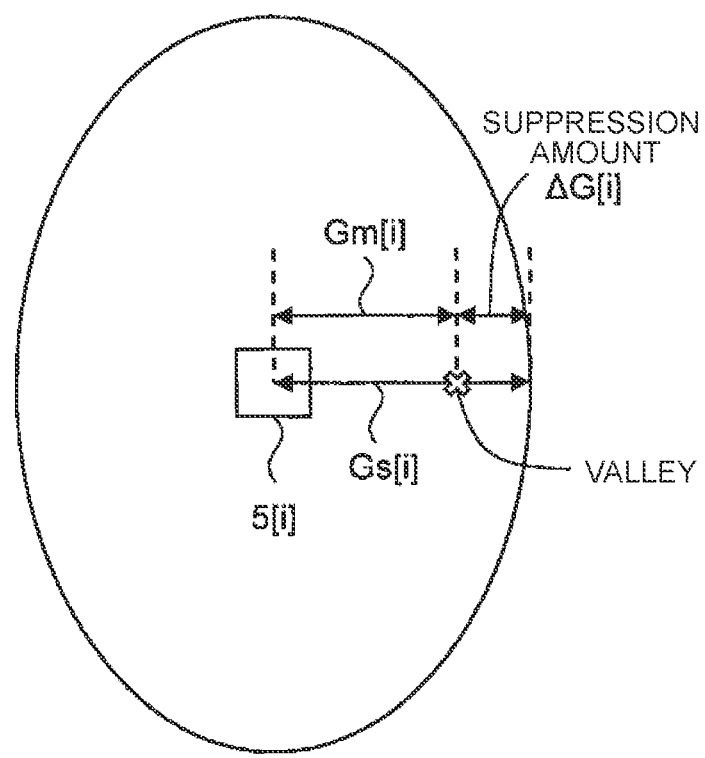
FIG. 20 is a conceptual diagram illustrating a suppression amount used in the deceleration control according to the embodiment of the present disclosure.

FIG. 20 is a conceptual diagram illustrating the suppression amount used in the deceleration control.

First, a unit gap Gs[i] related to the object 5[i] will be described. The unit gap Gs[i] is a lateral distance between the vehicle 1 and the object 5[i] and is a lateral distance at which the occupant does not feel uneasy when the vehicle 1 passes by the object 5[i]. That is, the unit gap Gs[i] is a target lateral distance. The unit gap Gs[i] is determined in advance for each object 5[i]. The unit gap Gs[i] may be a predetermined value different for each type of the object 5. For example, the unit gap Gs (e.g., 3 m) in the case where the object 5 is a pedestrian is larger than the unit gap Gs (e.g., 2 m) in the case where the object 5 is a parked vehicle. The unit gap Gs[i] may be set based on the distribution parameter σy (see FIG. 5) of the obstacle potential field Uo[i]. The information of the unit gap Gs[i] is included in the above-mentioned potential function information 300, for example.

Next, a correction gap Gm[i] related to the object 5[i] will be described. The correction gap Gm[i] is a lateral distance between the object 5[i] and the valley of the risk potential field U. The correction gap Gm[i] can be calculated based on the position of the object 5[i] and the risk potential field U.

A suppression amount ΔG[i] with respect to the object 5[i] is expressed by the following equation (3). That is, the suppression amount ΔG[i] is the difference between the unit gap Gs[i] and the correction gap Gm[i].

Equation 3

$$\Delta G[i] = Gs[i] - Gm[i] \quad (3)$$

When the correction gap Gm[i] is smaller than the unit gap Gs[i], it means that another object 5[j] is present near the object 5[i] and the unit gap Gs[i] cannot be secured. That is, the situation where the correction gap Gm[i] is smaller than the unit gap Gs[i] corresponds to the situation shown in FIG. 19. In some embodiments, in such a situation, a deceleration control is executed in order to reduce the collision risk and the anxiety of the occupant. Thus, it can be said that the suppression amount ΔG[i] represented by the above equation (3) represents the necessity of the deceleration control.

According to the present embodiment, it is determined whether to execute the deceleration control based on the suppression amount ΔG[i]. Specifically, when the suppression amount ΔG[i] is larger than a threshold value Gth, the deceleration control is executed. A target deceleration At in the deceleration control may be set based on the suppression amount ΔG[i]. For example, the target deceleration At (absolute value) is set to increase as the suppression amount ΔG[i] increases.

As described above, in the deceleration control based on the risk potential field U, the suppression amount ΔG[i] is used as a determination criterion. In some embodiments, in order to properly execute the deceleration control, the suppression amount ΔG[i] is calculated. In some embodiments, in order to properly calculate the suppression amount ΔG[i], the proximity situation of the object 5[i] is considered. There is room for improvement in the calculation of the suppression amount ΔG[i]. This will be described with comparative examples.

4-2. Comparative Example

First, a comparative example will be described. As in Section 3-2 above, the comparative risk potential field Uc is used in the comparative example. The comparative risk potential field Uc is the sum of the lane center potential field Ur and the obstacle potential field Uo[i] (see equation (1)).

Figure 21:
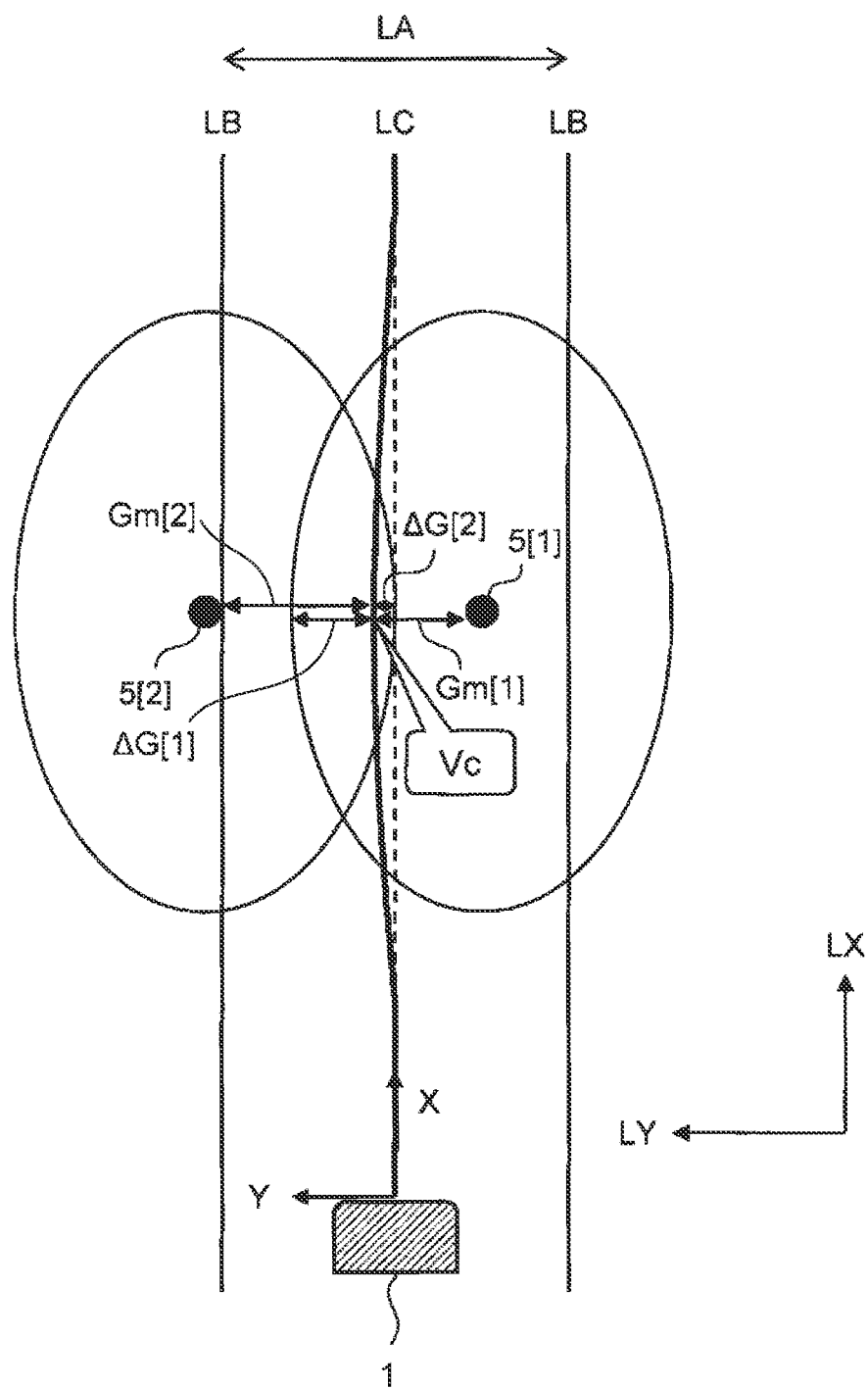
FIG. 21 is a conceptual diagram illustrating an example of the deceleration control according to the comparative example.

FIG. 21 shows an example of a deceleration control according to the comparative example. The positional relationship between the two objects 5[1] and 5[2] is the same as that in the case of FIG. 19 described above. For the sake of simplicity, it is assumed that the obstacle potential field Uo[1] related to the object 5[1] and the obstacle potential field Uo[2] related to the object 5[2] have the same magnitude. Further, it is assumed that the unit gap Gs[1] related to the object 5[1] and the unit gap Gs[2] related to the object 5[2] are the same.

In the example shown in FIG. 21, the midpoint between the two objects 5[1] and 5[2] is located on the left side of the lane center LC. Since the comparative risk potential field Uc includes the lane center potential field Ur, the valley Vc of the comparative risk potential field Uc is shifted to a position more toward the lane center LC than the midpoint between the two objects 5[1] and 5[2]. In other words, the valley Vc is shifted to a position more toward the object 5[1] than the midpoint between the two objects 5[1] and 5[2]. The correction gaps Gm[1] and Gm[2] are calculated based on the position of the valley Vc. As a result, the correction gap Gm[1] for the object 5[1] is underestimated, and the suppression amount ΔG[1] is overestimated. Conversely, the correction gap Gm[2] for the object 5[2] is overestimated and the suppression amount ΔG[2] is underestimated. It can be said that the lane center potential field Ur has an unnecessary influence on the suppression amounts ΔG[1] and ΔG[2].

When the suppression amount ΔG[1] is excessive, the deceleration control operates unnecessarily with respect to the object 5[1], or the target deceleration At in the deceleration control becomes excessive. The occupant (typically, the driver) of the vehicle 1 may feel uncomfortable with such unnecessary deceleration control or excessive deceleration control.

4-3. Deceleration Control Based on Second Risk Potential Field

Figure 22:
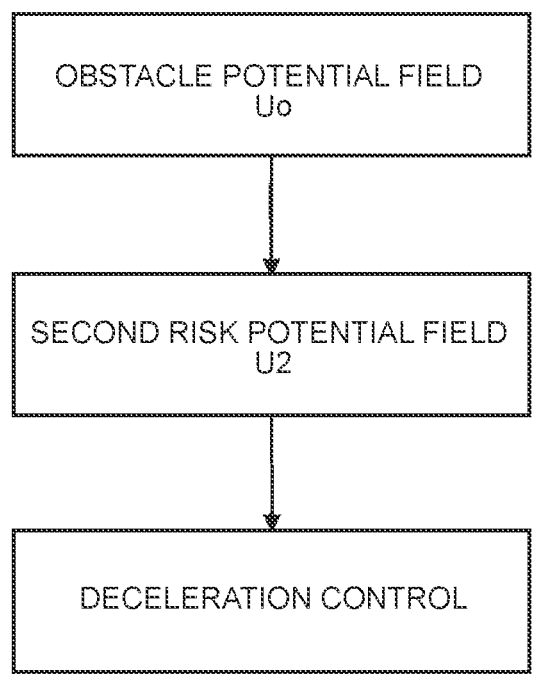
FIG. 22 is a block diagram illustrating an overview of the deceleration control according to the embodiment of the present disclosure.

FIG. 22 is a block diagram illustrating an overview of the deceleration control according to the present embodiment.

According to the present embodiment, a second risk potential field U2 represented by the following equation (4) is applied instead of the comparative risk potential field Uc. The second risk potential field U2 is the sum of the obstacle potential fields Uo[i] respectively set for the objects 5[i].

Equation 4

$$U2 = \sum_{i}^{n} Uo[i] \quad (4)$$

The processor 110 calculates the correction gap Gm[i] and the suppression amount ΔG[i] based on the second risk potential field U2. More specifically, a second valley V2 is a valley of the risk value R represented by the second risk potential field U2. The correction gap Gm[i] is the lateral distance between the object 5[i] and the second valley V2. The suppression amount ΔG[i] is the difference between the unit gap Gs[i] and the correction gap Gm[i] (see equation (3)).

Figure 23:
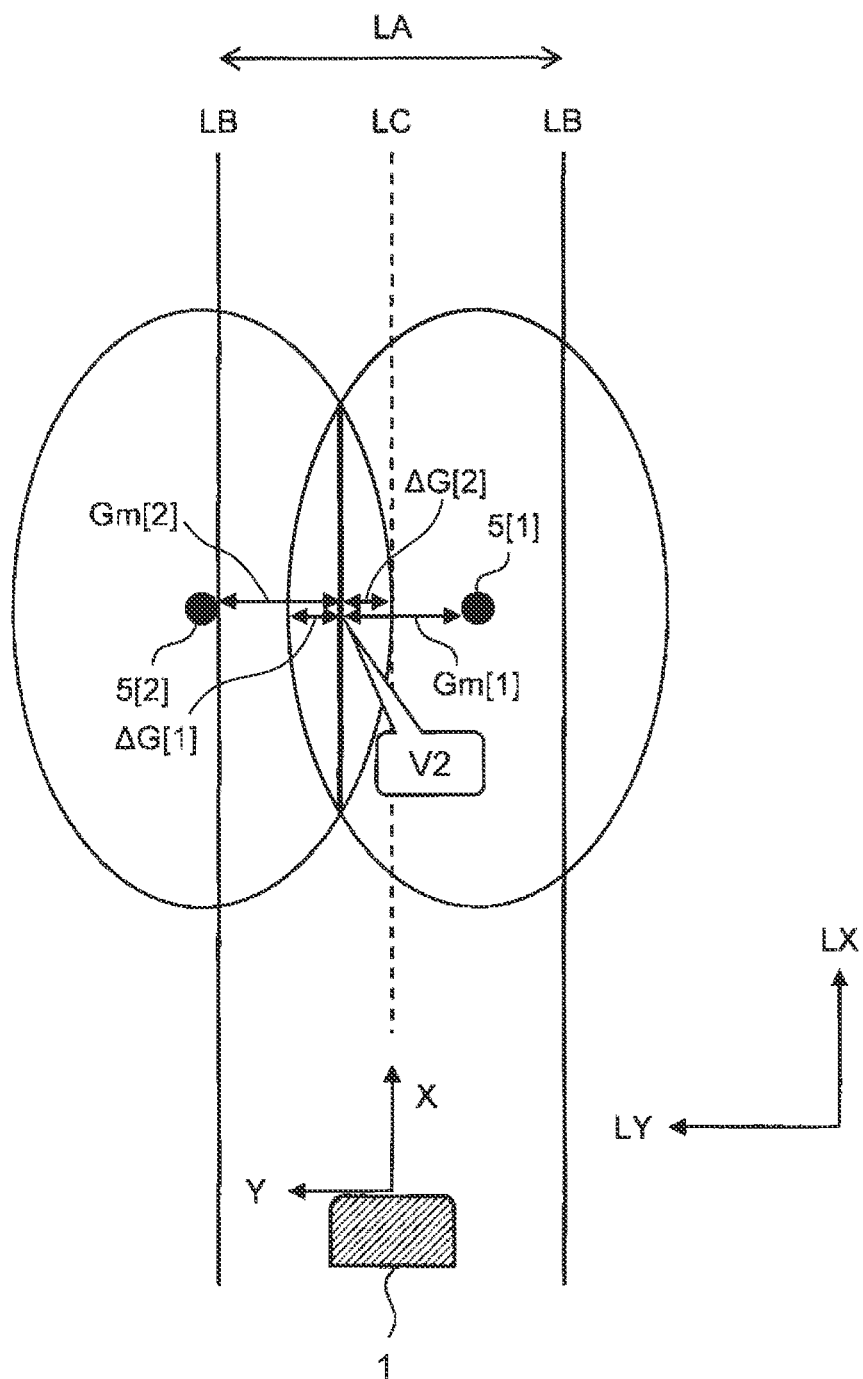
FIG. 23 is a conceptual diagram illustrating an example of the deceleration control according to the embodiment of the present disclosure.

FIG. 23 shows an example of the deceleration control according to the present embodiment. The positional relationship of the object 5[i], the obstacle potential field Uo[i], and the unit gap Gs[i] are the same as those in the comparative example shown in FIG. 21. Since the second risk potential field U2 includes only the obstacle potential field Uo[i], the position of the second valley V2 of the second risk potential field U2 coincides with the midpoint between the two objects 5[1] and 5[2]. Therefore, overestimation or underestimation of the suppression amounts ΔG[1] and ΔG[2] is suppressed. Thus, both the suppression amounts ΔG[1] and ΔG[2] become reasonable values incorporating the proximity situation of the objects 5[1] and 5[2].

As described above, according to the present embodiment, the second risk potential field U2 is used to calculate the suppression amount ΔG[i]. Since the second risk potential field U2 includes only the obstacle potential field Uo[i], the position of the second valley V2 is determined based on only the positional relationship of the object 5[i]. The suppression amount ΔG[i] is calculated based on such a second valley V2, so an appropriate suppression amount ΔG[i] incorporating the proximity situation of the object 5[i] can be obtained. As a result, an unnecessary deceleration control or an excessive deceleration control is suppressed. Thus, the discomfort felt by the occupant of the vehicle 1 is suppressed. This contributes to the improvement of reliability of the driving support system 10.

It should be noted that the second risk potential field U2 is only used for calculating the suppression amount ΔG[i], and is not used for steering control.

4-4. Process Flow

Figure 24:
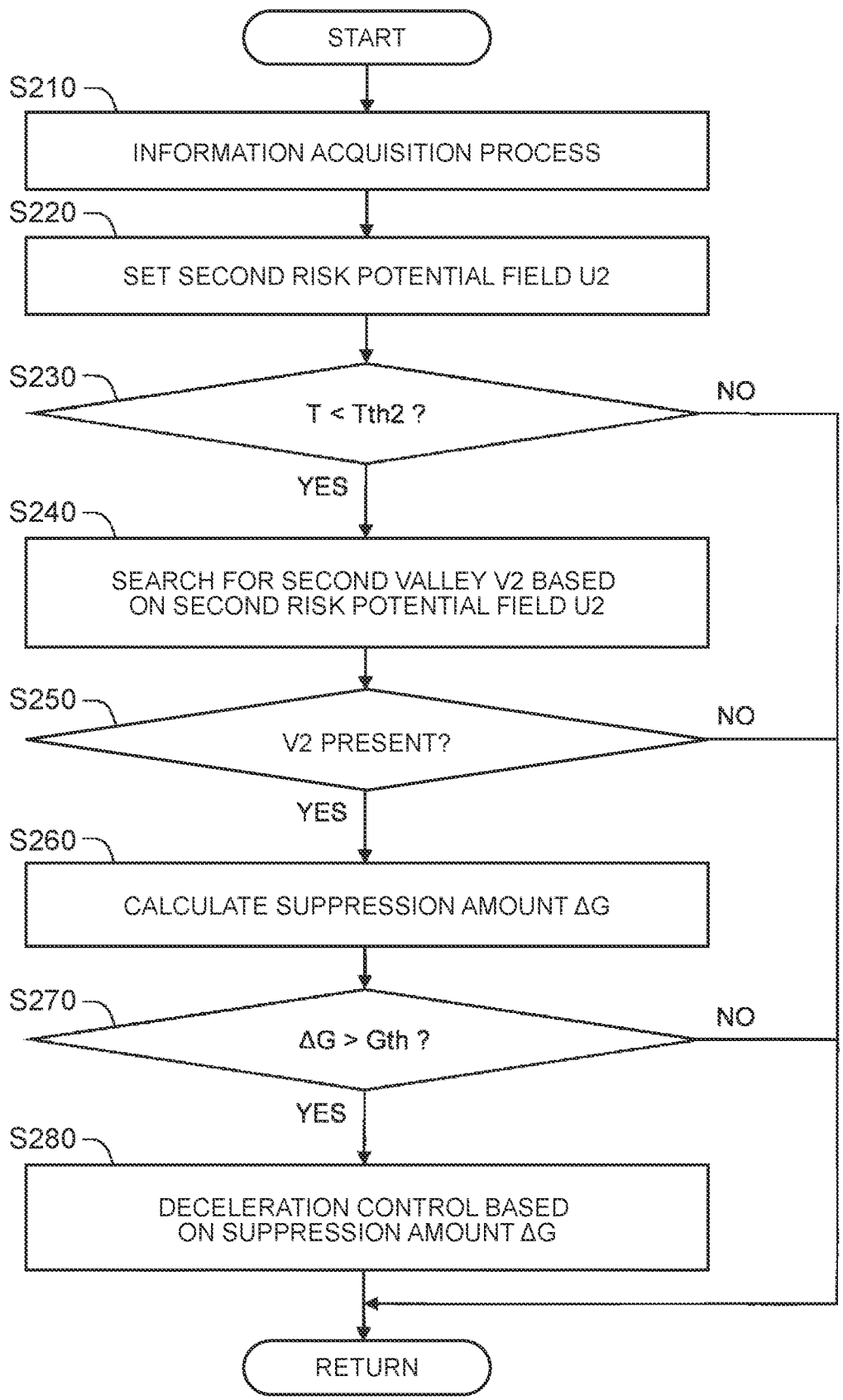
FIG. 24 is a flowchart showing a process related to the deceleration control according to the embodiment of the present disclosure.

FIG. 24 is a flowchart showing a process related to the deceleration control according to the present embodiment. The process flow shown in FIG. 24 is repeatedly executed at regular cycles.

4-4-1. Step S210

In step S210, the processor 110 executes the above-mentioned information acquisition process. That is, the processor 110 acquires the driving environment information 200 based on the detection result of the sensor group 20. The driving environment information 200 is stored in the storage device 120. Note that step S210 may be the same as step S110 in FIG. 14.

4-4-2. Step S220

In step S220, the processor 110 sets the second risk potential field U2. The second risk potential field U2 is the sum of the obstacle potential fields Uo[i] (see equation (4)). The processor 110 sets the obstacle potential field Uo[i] for each object 5[i] based on the driving environment information 200 and the potential function information 300. Then, the processor 110 sets the second risk potential field U2 by superimposing only the obstacle potential field Uo[i] set for the object 5[i].

Figure 25:
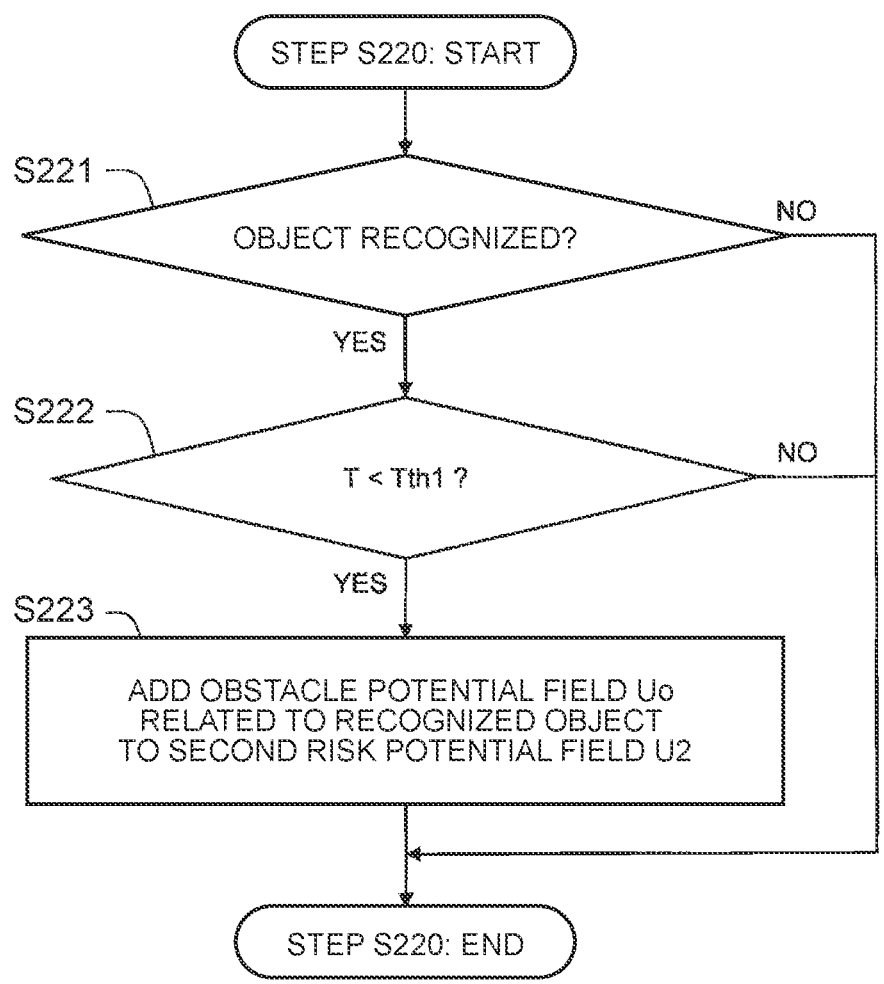
FIG. 25 is a flowchart showing a process example in step S220 in FIG. 24.

FIG. 25 is a flowchart showing an example of a process in step S220.

In step S221, the processor 110 determines whether there is the object 5 in front of the vehicle 1 based on the object information 250. In other words, the processor 110 determines whether the object 5 is recognized in the region in front of the vehicle 1. When the object 5 in front of the vehicle 1 is recognized (step S221; Yes), the process proceeds to step S222. Otherwise (step S221; No), step S220 ends. Note that step S221 may be the same as step S122 in FIG. 15.

In step S222, the processor 110 determines whether the margin time T to the recognized object 5 is less than the first time threshold value Tth1. When the margin time T is less than the first time threshold value Tth1 (step S222; Yes), the process proceeds to step S223. Otherwise (step S222; No), step S220 ends. Note that step S222 may be the same as step S123 in FIG. 15.

In step S223, the processor 110 sets the obstacle potential field Uo related to the recognized object 5 based on the driving environment information 200 and the potential function information 300. Then, the processor 110 adds the obstacle potential field Uo to the second risk potential field U2. Thus, when the vehicle 1 approaches the object 5 to some extent, the obstacle potential field Uo related to the object 5 is added to the second risk potential field U2.

4-4-3. Step S230

In step S230, the processor 110 determines whether the margin time T is less than a second time threshold value Tth2. The second time threshold value Tth2 (e.g., about four to five seconds) is smaller than the above-mentioned first time threshold value Tth1. When the margin time T is less than the second time threshold value Tth2 (step S230; Yes), the process proceeds to step S240. Otherwise (step S230; No), the process in this cycle ends. It should be noted that "the margin time T is less than the second time threshold value Tth2" is a first activation condition of the deceleration control.

4-4-4. Step S240

In step S240, the processor 110 searches for the second valley V2 based on the second risk potential field U2. In particular, the processor 110 searches for the second valley V2 in the vicinity of the object 5[i].

Figure 26:
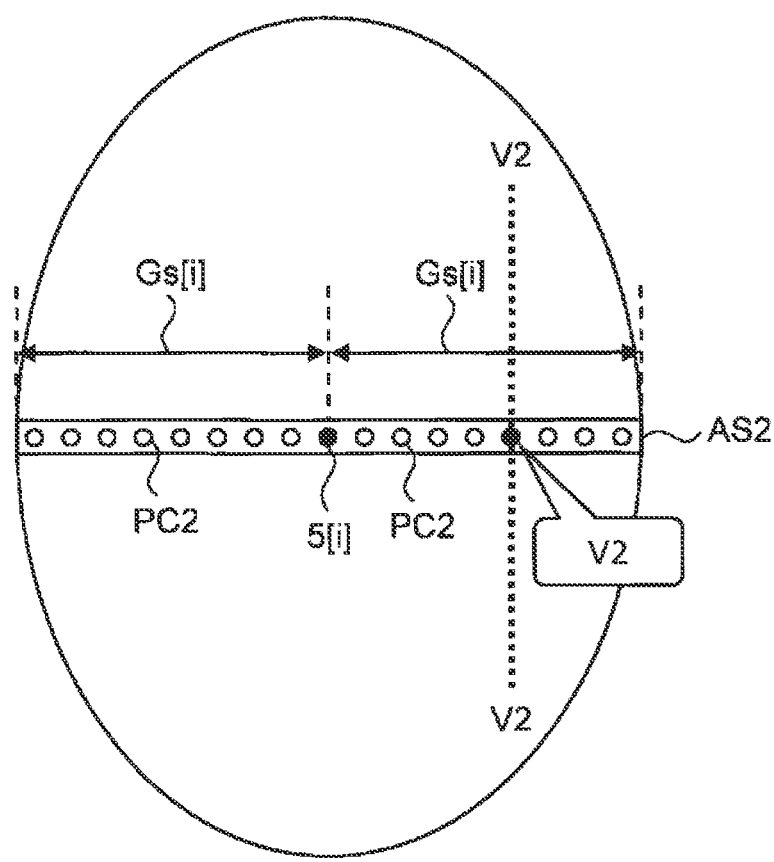
FIG. 26 is a conceptual diagram illustrating the deceleration control according to the embodiment of the present disclosure.

The search for the second valley V2 will be described with reference to FIG. 26. The processor 110 sets a second search range AS2 as shown in FIG. 26. The second search range AS2 is a range between the position of the object 5[i] and a position away from the object 5[i] by the unit gap Gs[i]. The position of the object 5[i] is obtained from the object information 250. The unit gap Gs[i] is obtained from the potential function information 300. The processor 110 sets the second search range AS2 based on the driving environment information 200 and the potential function information 300.

Further, the processor 110 sets a plurality of checkpoints PC2 in the second search range AS2. The processor 110 calculates the risk value R at each checkpoint PC2 with reference to the second risk potential field U2. By substituting the position of each checkpoint PC2 into the potential function fo constituting the second risk potential field U2, the risk value R at each checkpoint PC2 can be calculated. The second valley V2 is the checkpoint PC2 at which the risk value R is minimized.

Thus, the second valley V2 is searched for in the second search range AS2 in the vicinity of the object 5[$i$]. It is not necessary to calculate the risk value R over the entire lane LA to search for the second valley V2. Therefore, the calculation load required for searching for the second valley V2 is significantly reduced.

4-4-5. Step S250

In step S250, the processor 110 determines whether the second valley V2 (minimum point) is present in the second search range AS2. When the second valley V2 is not present in the second search range AS2 (step S250; No), it means that there is a sufficient distance between the object 5[$i$] and another object 5[$j$]. In this case, the processor 110 determines that it is not necessary to execute the deceleration control, and ends the process in this cycle.

When the second valley V2 is present in the second search range AS2 (step S250; Yes), it means that there is another object 5[$j$] near the object 5[$i$] and the unit gap Gs[$i$] cannot be secured. In this case, the process proceeds to step S260. It should be noted that "the second valley V2 is present in the second search range AS2" is a second operating condition of the deceleration control.

4-4-6. Step S260

In step S260, the processor 110 calculates the suppression amount ΔG[$i$] for the object 5[$i$]. Specifically, the processor 110 calculates the lateral distance between the object 5[$i$] and the second valley V2 as the correction gap Gm[$i$]. Then, the processor 110 calculates the difference between the unit gap Gs[$i$] and the correction gap Gm[$i$] as the suppression amount ΔG[$i$] (see equation (3)).

4-4-7. Step S270

In step S270, the processor 110 determines whether the suppression amount ΔG[$i$] is larger than the threshold value Gth. When the suppression amount ΔG[$i$] is larger than the threshold value Gth (step S270; Yes), the process proceeds to step S280. Otherwise (step S270; No), the process in this cycle ends. "The suppression amount ΔG[$i$] is larger than the threshold value Gth" is a third operating condition of the deceleration control.

4-4-8. Step S280

In step S280, the processor 110 executes the deceleration control. For example, the processor 110 sets the target deceleration At based on the suppression amount ΔG[$i$]. In that case, the target deceleration At (absolute value) is set to increase as the suppression amount ΔG[$i$] increases. A function (e.g., map) showing the correspondence between the suppression amount ΔG[$i$] and the target deceleration is generated in advance. The processor 110 calculates the target deceleration At in accordance with the suppression amount ΔG[$i$] by referring to the function.

Then, the processor 110 executes the deceleration control according to the target deceleration At. The speed of the vehicle 1 is obtained from the vehicle state information 220. The processor 110 controls the braking device 33 such that the target deceleration At is realized.

4-5. Effect

As described above, according to the present embodiment, the second risk potential field U2 is applied to the deceleration control of the risk avoidance control. Specifically, the second risk potential field U2 is used for calculating the suppression amount ΔG[$i$], and the suppression amount ΔG[$i$] is used as a criterion for determining whether to execute the deceleration control. Since the second risk potential field U2 includes only the obstacle potential field Uo[$i$], the position of the second valley V2 is determined based on only the positional relationship of the object 5[$i$]. The suppression amount ΔG[$i$] is calculated based on such a second valley V2, so an appropriate suppression amount ΔG[$i$] incorporating the proximity situation of the object 5[$i$] can be obtained. As a result, an unnecessary deceleration control or an excessive deceleration control is suppressed (see FIG. 23). Thus, the discomfort felt by the occupant of the vehicle 1 is suppressed. This contributes to the improvement of reliability of the driving support system 10.

Further, according to the present embodiment, the second valley V2 is searched for in the second search range AS2 in the vicinity of the object 5[$i$]. When the second valley V2 is not present in the second search range AS2, the correction gap Gm[$i$] and the suppression amount ΔG[$i$] are not calculated because the deceleration control does not need to be executed. As a result, the calculation load is reduced.

5. Combination of Steering Control and Deceleration Control

Figure 27:
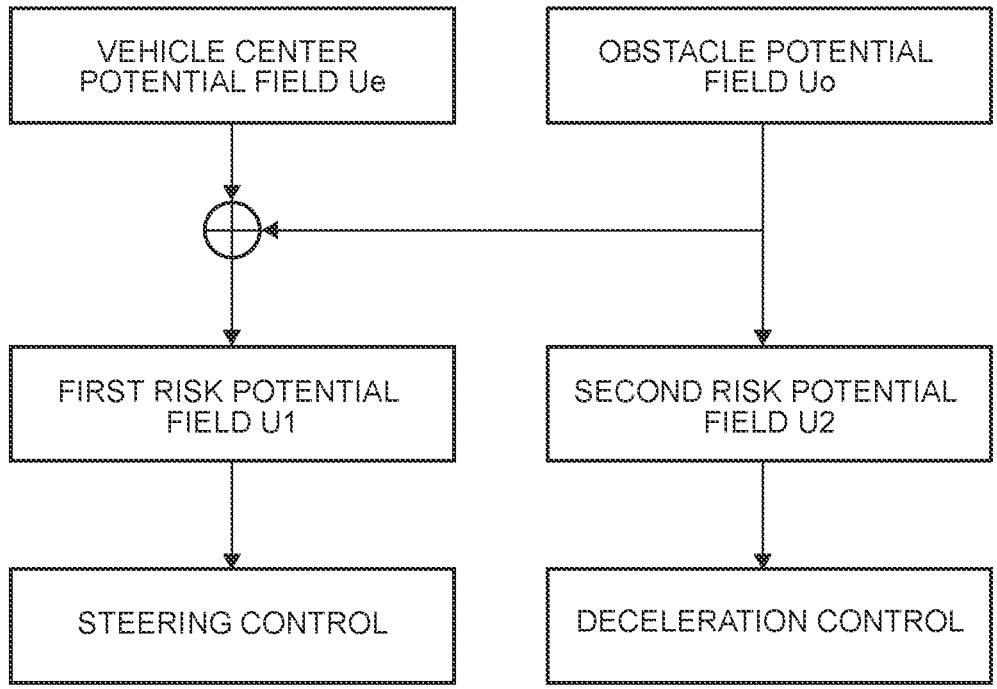
FIG. 27 is a block diagram showing a combination of the steering control and the deceleration control according to the embodiment of the present disclosure.

FIG. 27 is a block diagram showing a combination of the steering control and the deceleration control according to the present embodiment. The first risk potential field U1 is applied to the steering control, and the second risk potential field U2 is applied to the deceleration control. That is, the risk potential field U applied to the steering control and the risk potential field U applied to the deceleration control are different. This provides both the effects described in Section 3 and the effects described in Section 4.

6. Modification

Figure 28:
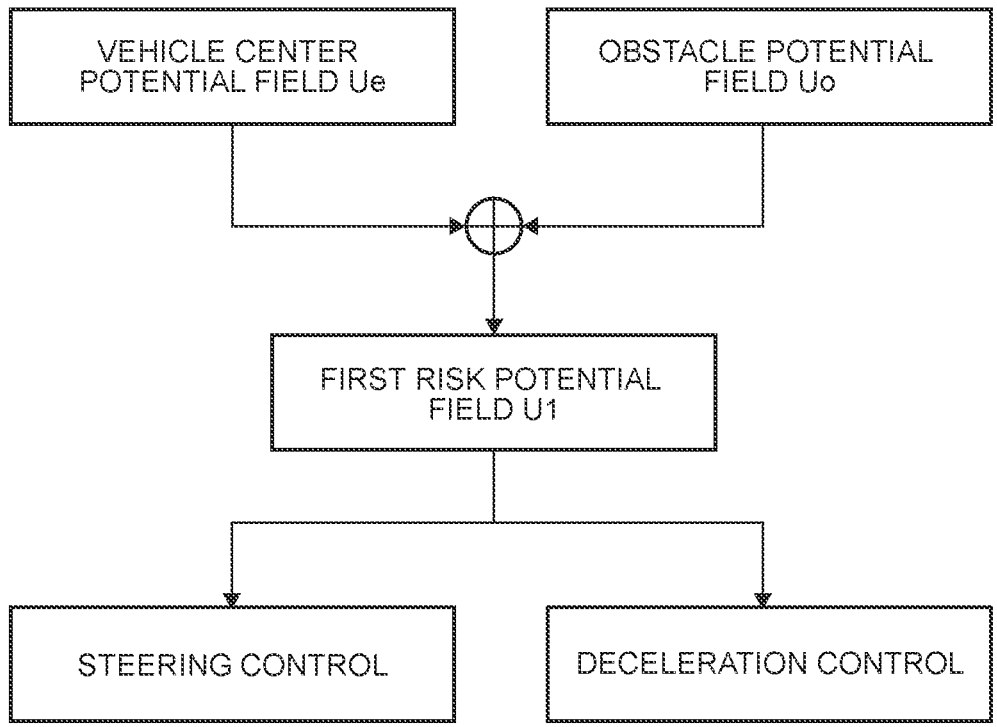
FIG. 28 is a block diagram showing a combination of the steering control and the deceleration control according to a modification of the embodiment of the present disclosure.

FIG. 28 is a block diagram showing a combination of the steering control and the deceleration control according to a modification. In the modification, the first risk potential field U1 is applied to the deceleration control instead of the second risk potential field U2. The processor 110 calculates the correction gap Gm[$i$] and the suppression amount ΔG[$i$] based on the first risk potential field U1. The correction gap Gm[$i$] is the lateral distance between the object 5[$i$] and the first valley V1.

Figure 29:
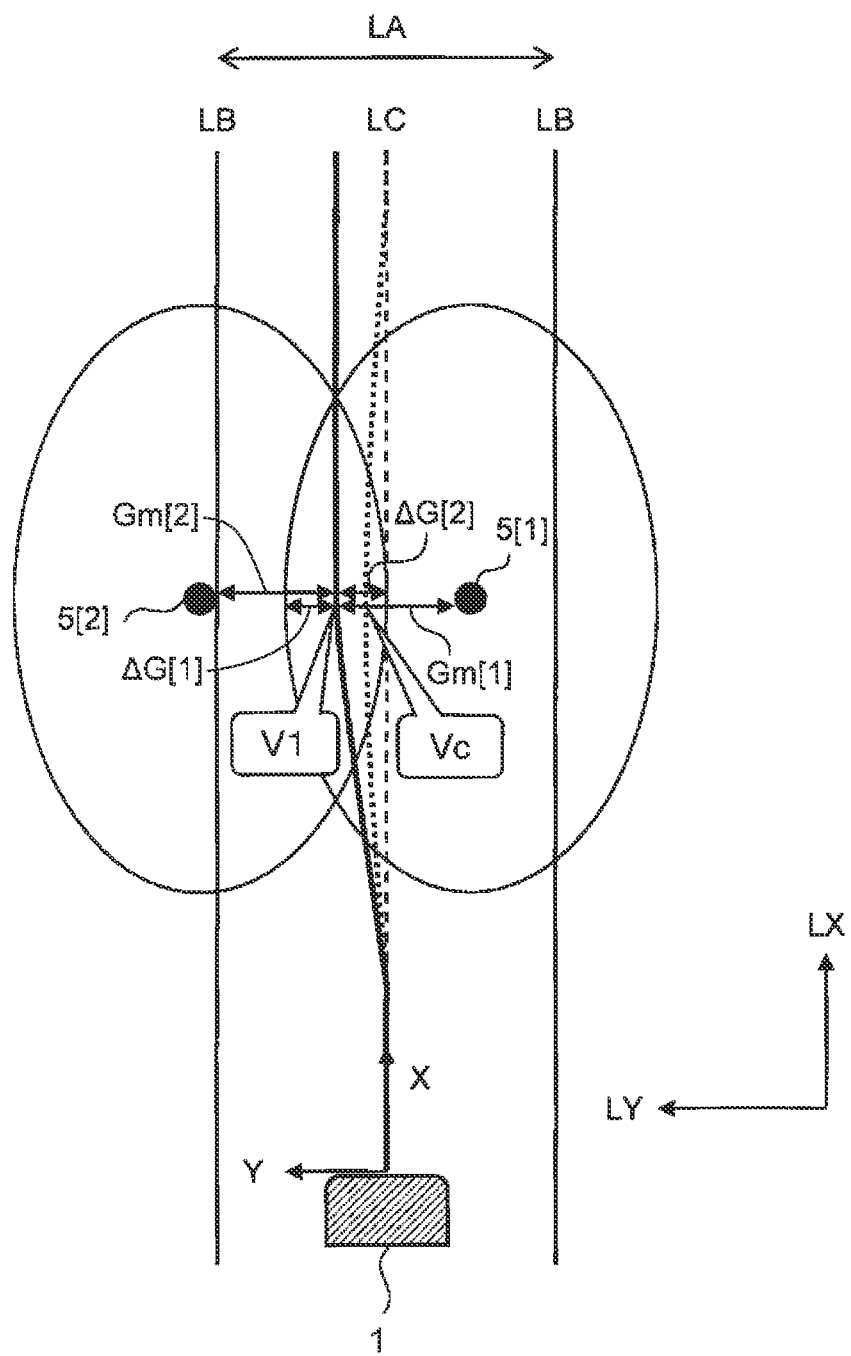
FIG. 29 is a conceptual diagram illustrating the deceleration control according to the modification of the embodiment of the present disclosure.

FIG. 29 shows an example of the deceleration control according to the modification. The positional relationship of the object 5[$i$], the obstacle potential field Uo[$i$], and the unit gap Gs[$i$] are the same as those shown in FIGS. 21 and 23. The position of the valley Ve of the vehicle center potential field Ue included in the first risk potential field U1 is not fixed and dynamically changes with the position of the vehicle 1. Therefore, when the vehicle 1 moves to the left by the steering control, the first valley V1 of the first risk potential field U1 also shifts to the left. As a result, the first valley V1 becomes closer to the second valley V2 of the second risk potential field U2 than to the valley Vc in the case of the comparative example. Thus, a more appropriate suppression amount ΔG[$i$] can be obtained than in the case of the comparative example.

As described above, even when the first risk potential field U1 is applied to the deceleration control instead of the second risk potential field U2, a certain effect can be obtained.

What is claimed is:

1. A driving support system that supports driving of a vehicle, the driving support system comprising:
a storage device that stores driving environment information indicating a driving environment of the vehicle; and a processor that executes a risk avoidance control for reducing a risk of collision with an object in front of the vehicle, based on the driving environment information, wherein:

a risk potential field represents a risk value as a function of position;

an obstacle potential field is the risk potential field in which the risk value is maximum at a position of the object and decreases as a distance from the object increases;

a lane longitudinal direction is a direction along which a lane in which the vehicle is present extends;

a vehicle center potential field is the risk potential field in which a valley of the risk value extends in the lane longitudinal direction from a position of the vehicle;

a position of the valley in the vehicle center potential field changes with the position of the vehicle;

the risk avoidance control includes a steering control for steering the vehicle;

the processor sets the vehicle center potential field and the obstacle potential field based on the driving environment information, sets a sum of the vehicle center potential field and the obstacle potential field as a first risk potential field, and executes the steering control such that the vehicle follows a first valley, the first valley being the valley of the risk value represented by the first risk potential field;

the risk avoidance control further includes a deceleration control for decelerating the vehicle;

the processor sets a second risk potential field including the obstacle potential field;

a second valley is a valley of the risk value represented by the second risk potential field;

a correction gap is a lateral distance between the object and the second valley; and when the correction gap is smaller than a predetermined gap and a suppression amount is larger than a threshold value, the processor executes the deceleration control, the suppression amount being a difference between the predetermined gap and the correction gap.

2. The driving support system according to claim 1, wherein:

a lane width direction is a direction orthogonal to the lane longitudinal direction; and the processor sets a forward gaze point at a position in front of the vehicle by a first distance along a traveling direction of the vehicle, calculates a first deviation based on the first risk potential field, the first deviation being a deviation in the lane width direction between the forward gaze point and the first valley, and executes the steering control such that the first deviation decreases.

3. The driving support system according to claim 2, wherein:

a first search range is a range extending in the lane width direction from the forward gaze point; and the processor searches for the first valley within the first search range.

4. The driving support system according to claim 1, wherein the processor sets the second risk potential field by superimposing only the obstacle potential fields set for the respective objects without using the vehicle center potential field.

5. The driving support system according to claim 1, wherein the processor sets a target deceleration such that the target deceleration increases as the suppression amount increases, and executes the deceleration control in accordance with the target deceleration.

6. The driving support system according to claim 1, wherein:

a second search range is a range between the position of the object and a position away from the object by the predetermined gap; and the processor searches for the second valley within the second search range, calculates the suppression amount when the second valley is present in the second search range, and does not calculate the suppression amount and does not execute the deceleration control when the second valley is not present in the second search range.

7. A driving support system that supports driving of a vehicle, the driving support system comprising:

a storage device that stores driving environment information indicating a driving environment of the vehicle; and a processor that executes a risk avoidance control for reducing a risk of collision with an object in front of the vehicle, based on the driving environment information, wherein:

a risk potential field represents a risk value as a function of position;

an obstacle potential field is the risk potential field in which the risk value is maximum at a position of the object and decreases as a distance from the object increases;

the risk avoidance control includes a deceleration control for decelerating the vehicle;

the processor sets the obstacle potential field based on the driving environment information, and sets a second risk potential field by superimposing only the obstacle potential fields set for the respective objects;

a second valley is a valley of the risk value represented by the second risk potential field;

a correction gap is a lateral distance between the object and the second valley; and when the correction gap is smaller than a predetermined gap and a suppression amount is larger than a threshold value, the processor executes the deceleration control, the suppression amount being a difference between the predetermined gap and the correction gap.

* * * * *